(12) United States Patent
Nakamura

(10) Patent No.: US 7,481,199 B2
(45) Date of Patent: Jan. 27, 2009

(54) START CONTROL APPARATUS OF INTERNAL COMBUSTION ENGINE

(75) Inventor: Makoto Nakamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/907,885

(22) Filed: Oct. 18, 2007

(65) Prior Publication Data

US 2008/0097685 A1 Apr. 24, 2008

(30) Foreign Application Priority Data

Oct. 23, 2006 (JP) ............................. 2006-287106

(51) Int. Cl.
*F02D 13/00* (2006.01)
*F02B 75/04* (2006.01)

(52) U.S. Cl. .................. 123/345; 123/48 R; 123/78 R; 123/90.15; 123/179.1

(58) Field of Classification Search ............... 123/48 R, 123/48 B, 78 R, 78 A, 78 AA, 90.15, 90.16, 123/90.17, 90.18, 179.1, 179.3, 179.5, 345, 123/346, 321, 322

See application file for complete search history.

(56) References Cited

U.S. PATENT DOCUMENTS 6,647,935 B2 * 11/2003 Aoyama et al. .......... 123/90.16
6,691,655 B2 * 2/2004 Aoyama et al. .......... 123/90.16
6,732,682 B2 * 5/2004 Aoyama et al. ........... 123/48 B
6,769,404 B2 * 8/2004 Aoyama et al. ........ 123/406.29
6,951,211 B2 * 10/2005 Bryant .................... 123/559.1

FOREIGN PATENT DOCUMENTS

JP 2002-276446 A 9/2002
JP 2003-172112 A 6/2003

* cited by examiner

*Primary Examiner*—John T Kwon
(74) *Attorney, Agent, or Firm*—Foley & Lardner LLP

(57) ABSTRACT

A start control apparatus for an internal combustion engine includes first and second control mechanisms which are individually arranged to vary at least one of a compression ratio and an expansion ratio of a cylinder of the internal combustion engine. The start control apparatus measures a state of the internal combustion engine before cranking the internal combustion engine, wherein the state includes a state of the second control mechanism; sets a first control signal in accordance with the measured state of the internal combustion engine; and outputs the set first control signal to the first control mechanism before cranking the internal combustion engine.

18 Claims, 24 Drawing Sheets

START CONTROL APPARATUS OF INTERNAL COMBUSTION ENGINE

BACKGROUND OF THE INVENTION

The present invention relates generally to internal combustion engines, and more particularly to start control apparatuses for controlling the starting operation of internal combustion engines.

It becomes increasingly important to enhance the startability of internal combustion engines, because there are increasingly severe regulations for exhaust emissions at engine start, and because there is an increasing number of hybrid vehicles or vehicles equipped with an automatic engine stop function which frequently restart internal combustion engines.

Japanese Patent Application Publication No. 2002-276446 discloses a start control device for an internal combustion engine which includes a variable valve mechanism for varying at least the closing timing of intake valves, and a variable compression ratio mechanism for varying the nominal compression ratio of the internal combustion engine. The variable valve mechanism includes a valve event and lift control mechanism for continuously varying (expanding or contracting) the lift degree (defined by the lift height and operating angle) of the intake valves, and a valve lift phase control mechanism for continuously varying (advancing or retarding) the lift central phase (the central phase of the valve operating angle). The start control device is configured to control none of the variable valve mechanism and the variable compression ratio mechanism during an initial stage of the cranking operation of the internal combustion engine. For example, the start control device holds the valve lift degree constant during the initial stage of the cranking operation. After the engine speed increases due to the cranking operation, the start control device retards the valve lift central phase so that the intake valve closing timing approaches bottom dead center, thereby increasing the effective compression ratio so as to increase the intake air temperature. This is intended for enhancing the flammability in the cylinder at engine start, and quickly completing the starting operation of the internal combustion engine.

SUMMARY OF THE INVENTION

The start control device disclosed in Japanese Patent Application Publication No. 2002-276446 outputs control signals to the variable valve mechanism and the variable compression ratio mechanism after start of the cranking operation. Naturally, the variable valve mechanism and the variable compression ratio mechanism reach their respective desired positions at least after the start of the cranking operation. When the crankshaft starts to rotate, specifically, when the crankshaft starts the first cranking rotation, the compression ratio remains constant away from its desired value, because the compression ratio starts to be controlled after the start of the cranking operation.

Therefore, it is desirable to control the compression ratio or the expansion ratio of an internal combustion engine in early timing so as to smoothly perform the cranking operation, and thereby enhancing the startability of the internal combustion engine.

According to one aspect of the present invention, a start control apparatus for an internal combustion engine, comprises: a first control mechanism arranged to vary at least one of a compression ratio and an expansion ratio of a cylinder of the internal combustion engine, the first control mechanism including a first actuator arranged to receive a first control signal, and to control at least one of the compression ratio and the expansion ratio in accordance with the first control signal; a second control mechanism arranged to vary at least one of the compression ratio and the expansion ratio, the second control mechanism including a second actuator arranged to receive a second control signal, and to control at least one of the compression ratio and the expansion ratio in accordance with the second control signal; and a controller connected to the first and second control mechanisms for outputting the first and second control signals, the controller being configured to: measure a state of the internal combustion engine before cranking the internal combustion engine, the state including a state of the second control mechanism; set the first control signal in accordance with the measured state of the internal combustion engine; and output the set first control signal to the first control mechanism before cranking the internal combustion engine. The first control mechanism may be arranged to vary at least one of the compression ratio and the expansion ratio by varying an effective stroke of a piston associated to the cylinder; and the second control mechanism may be arranged to vary at least one of the compression ratio and the expansion ratio by varying a combustion chamber volume of the cylinder. The first control mechanism may be arranged to vary the compression ratio by varying an intake valve closing timing, wherein the intake valve closing timing is defined as a timing when an intake valve associated to the cylinder closes; and the second control mechanism may be arranged to vary a nominal compression ratio of the cylinder, wherein the nominal compression ratio is geometrically defined as a ratio of a volumetric capacity of the cylinder at intake bottom dead center with respect to the volumetric capacity at compression top dead center. The state of the internal combustion engine may further include a temperature of the internal combustion engine. When judging the temperature of the internal combustion engine as being low before cranking the internal combustion engine, the controller may set the first control signal in such a manner to allow the first control mechanism to set the intake valve closing timing to approach bottom dead center with decrease in the nominal compression ratio. When judging the temperature of the internal combustion engine as being high before cranking the internal combustion engine, the controller may set the first control signal in such a manner to allow the first control mechanism to set the intake valve closing timing to deviate from bottom dead center with increase in the nominal compression ratio. The first control mechanism may be arranged to vary the expansion ratio by varying an exhaust valve opening timing, wherein the exhaust valve opening timing is defined as a timing when an exhaust valve associated to the cylinder opens; and the second control mechanism may be arranged to vary a nominal expansion ratio of the cylinder, wherein the nominal expansion ratio is geometrically defined as a ratio of a volumetric capacity of the cylinder at expansion bottom dead center with respect to the volumetric capacity at compression top dead center. When judging the temperature of the internal combustion engine as being low before cranking the internal combustion engine, the controller may set the first control signal in such a manner to allow the first control mechanism to set the exhaust valve opening timing to advance from bottom dead center with increase in the nominal expansion ratio. When judging the nominal expansion ratio as being low before cranking the internal combustion engine, the controller may set the first control signal in such a manner to allow the first control mechanism to set the exhaust valve opening timing to retard toward bottom dead center. The first control mechanism may be arranged to vary a nominal compression ratio of the cylinder, wherein the nominal compression ratio is geometrically defined as a ratio of a volumetric capacity of the cylinder at intake bottom dead center with respect to the volumetric capacity at compression top dead center; and the second control mechanism may be arranged to vary the compression ratio by varying an intake valve closing timing, wherein the intake valve closing timing is defined as a timing when an intake valve associated to the cylinder closes. The first control mechanism may be arranged to vary a nominal expansion ratio of the cylinder, wherein the nominal expansion ratio is geometrically defined as a ratio of a volumetric capacity of the cylinder at expansion bottom dead center with respect to the volumetric capacity at compression top dead center; and the second control mechanism may be arranged to vary the expansion ratio by varying an exhaust valve opening timing, wherein the exhaust valve opening timing is defined as a timing when an exhaust valve associated to the cylinder opens. The first control mechanism may be arranged to vary the compression ratio by varying an intake valve closing timing, wherein the intake valve closing timing is defined as a timing when an intake valve associated to the cylinder closes; and the second control mechanism may be arranged to vary the expansion ratio by varying an exhaust valve opening timing, wherein the exhaust valve opening timing is defined as a timing when an exhaust valve associated to the cylinder opens. The first control mechanism may be arranged to vary the expansion ratio by varying an exhaust valve opening timing, wherein the exhaust valve opening timing is defined as a timing when an exhaust valve associated to the cylinder opens; and the second control mechanism may be arranged to vary the compression ratio by varying an intake valve closing timing, wherein the intake valve closing timing is defined as a timing when an intake valve associated to the cylinder closes. The first control mechanism may be arranged to vary the compression ratio by varying an intake valve closing timing, wherein the intake valve closing timing is defined as a timing when an intake valve associated to the cylinder closes; and the second control mechanism may be arranged to vary the compression ratio by varying the intake valve closing timing. The first control mechanism may be arranged to vary the expansion ratio by varying an exhaust valve opening timing, wherein the exhaust valve opening timing is defined as a timing when an exhaust valve associated to the cylinder opens; and the second control mechanism may be arranged to vary the expansion ratio by varying the exhaust valve opening timing. The controller may be further configured to: output the second control signal to the second control mechanism in such a manner to bring the second control mechanism into a state desired for starting the internal combustion engine, before stopping the internal combustion engine.

According to another aspect of the invention, an internal combustion engine comprises: a cylinder; a first control mechanism arranged to vary at least one of a compression ratio and an expansion ratio of the cylinder, the first control mechanism including a first actuator arranged to receive a first control signal, and to control at least one of the compression ratio and the expansion ratio in accordance with the first control signal; a second control mechanism arranged to vary at least one of the compression ratio and the expansion ratio, the second control mechanism including a second actuator arranged to receive a second control signal, and to control at least one of the compression ratio and the expansion ratio in accordance with the second control signal; and a controller connected to the first and second control mechanisms for outputting the first and second control signals, the controller being configured to: measure a state of the internal combustion engine before cranking the internal combustion engine, the state including a state of the second control mechanism; set the first control signal in accordance with the measured state of the internal combustion engine; and output the set first control signal to the first control mechanism before cranking the internal combustion engine.

DETAILED DESCRIPTION OF THE INVENTION

Figure 1:
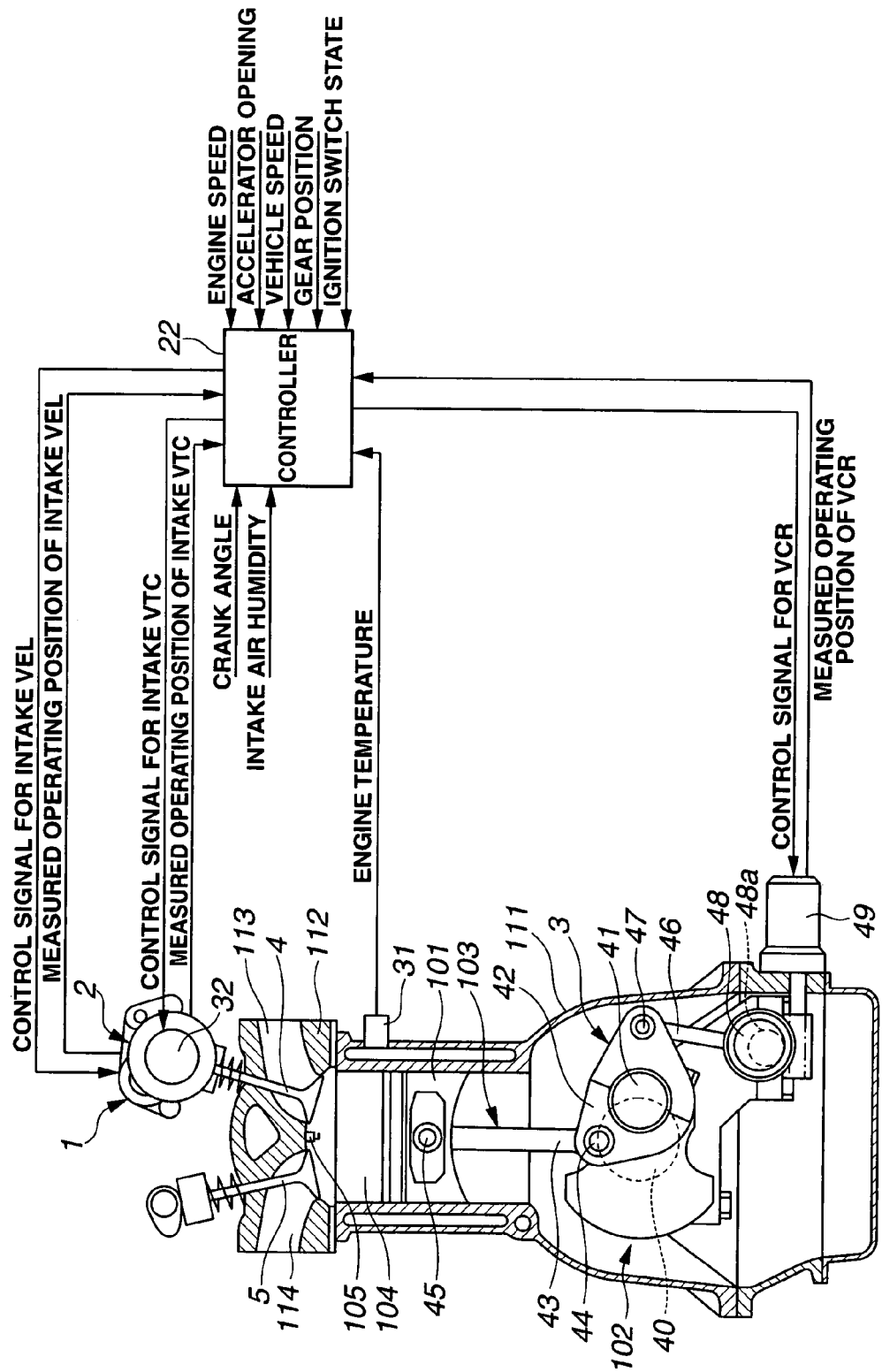
FIG. 1 is a schematic diagram showing an internal combustion engine with a start control apparatus according to a first embodiment of the present invention.

The following describes a start control apparatus for an internal combustion engine according to a first embodiment of the present invention with reference to FIGS. 1 to 9. The internal combustion engine is a four-cycle multi-cylinder internal combustion engine, but not so limited. The internal combustion engine is generally constructed as shown in FIG. 1. A cylinder bore is formed in a cylinder block 111. A piston 101 is mounted within the cylinder bore for sliding upwardly and downwardly due to combustion pressure. An intake port 113 and an exhaust port 114 are defined in a cylinder head 112. A pair of intake valves 4, 4 and a pair of exhaust valves 5, 5 are provided per cylinder for sliding in cylinder head 112 so as to open and close intake port 113 and exhaust port 114, respectively.

Piston 101 is connected to a crankshaft 102 through a connecting linkage 103. Connecting linkage 103 includes a lower link 42 and an upper link 43 as described in detail below. A combustion chamber 104 is defined between the crown of piston 101 and the lower face of cylinder head 112. An ignition plug 105 is provided at or near the center of cylinder head 112.

The start control apparatus includes a valve event and lift control mechanism 1 for controlling the lift degree of intake valves 4, 4, a valve lift phase control mechanism 2 for controlling the central phase of the operating angle of intake valves 4, 4, and a nominal compression ratio control mechanism 3 for controlling nominal compression ratio $\epsilon_{C0}$ of the cylinder. Valve event and lift control mechanism 1 may be referred to as VEL. Valve lift phase control mechanism 2 may be referred to as VTC (Valve Timing Control mechanism). Nominal compression ratio control mechanism 3 may be referred to as VCR (Variable Compression Ratio mechanism). The valve operating angle is indicative of a period during which a valve is opening, and may be expressed in terms of the crankshaft angle or the angular position of a drive shaft of valve event and lift control mechanism 1 which is described in detail below. The valve lift degree is indicative of a degree of opening of a valve. Specifically, according to valve event and lift control mechanism 1, when the valve lift degree changes, the valve lift height and the valve operating angle change, as described in detail below. In this embodiment, valve event and lift control mechanism 1 serves as a first control mechanism, while nominal compression ratio control mechanism 3 serves as a second control mechanism.

Valve event and lift control mechanism 1 varies effective compression ratio $\epsilon_C$ by varying the lift degree of intake valves 4, 4. Valve event and lift control mechanism 1 may be constructed as disclosed in Japanese Patent Application Publication No. 2003-172112. The entire contents of this Japanese Patent Application Publication No. 2003-172112 are hereby incorporated by reference.

Figure 2:
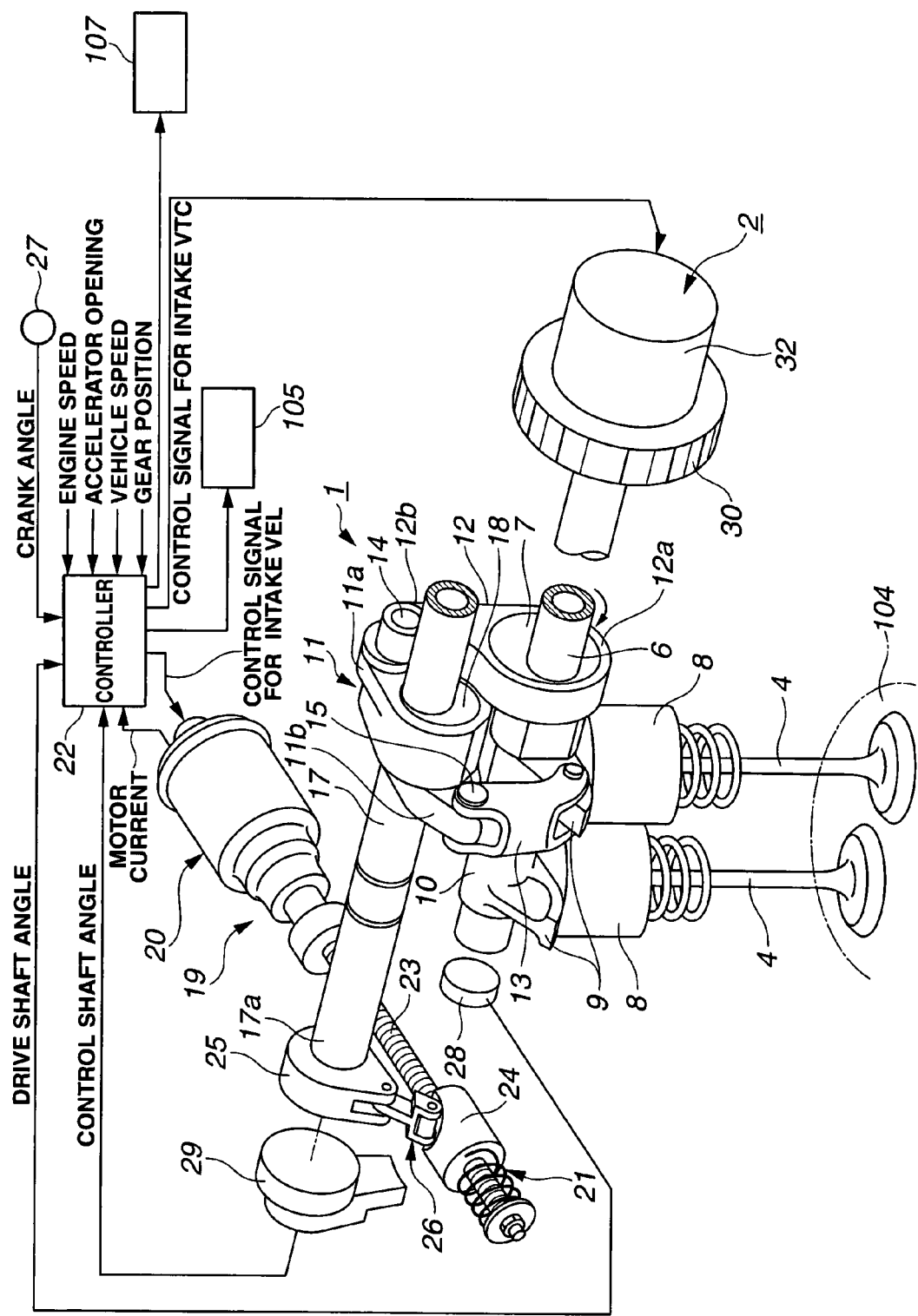
FIG. 2 is a schematic perspective view of a valve event and lift control mechanism and a valve lift phase control mechanism according to the first embodiment.

As shown in FIG. 2, valve event and lift control mechanism 1 includes: a hollow drive shaft 6 that is rotatably held on an upper portion of cylinder head 112 through bearings; a drive cam 7 for each cylinder that is fixed through press-fitting or the like to drive shaft 6 for rotation therewith; swing cams 9, 9 for each cylinder that are integrally mounted on a cylindrical camshaft 10 rotatably disposed on drive shaft 6 and operate in sliding contact with valve lifters 8, 8 of intake valves 4, 4 to induce an opening/closing operation of intake valves 4, 4; and a power transmitting mechanism that is arranged between drive cam 7 and swing cams 9, 9 to transmit a torque from drive cam 7 to swing cams 9, 9. Actually, due to a below-mentioned linkage construction of the power transmitting mechanism, the eccentric rotary motion of drive cam 7 is converted into a swinging motion or rocking motion of swing cams 9, 9.

Drive shaft 6 extends along the longitudinal axis of the engine. Drive shaft 6 has one end to which a torque is applied from crankshaft 102 through a timing sprocket 30 fixed to the end of drive shaft 6 and a timing chain that is put around timing sprocket 30 and crankshaft 102. Drive shaft 6 is thus driven or rotated by crankshaft 102. The direction of rotation of drive shaft 6 is shown by the curved arrow in FIG. 2.

Drive cam 7 is a circular disc that has a center axis displaced or eccentric from the center axis of drive shaft 6. More specifically, the circular disc 7 has at an eccentric portion thereof a circular opening through which drive shaft 6 passes. For the integral rotation of drive cam 7 with drive shaft 6, drive shaft 6 is secured to the circular opening of the drive cam 7 through press-fitting or the like. Each drive cam 7 is located in such a manner as not to interfere with valve lifters 8, 8.

Swing cams 9 are formed integrally with camshaft 10 at the ends of camshaft 10, and are swingably supported on drive shaft 6. Camshaft 10 is cylindrically shaped and is rotatably fitted on the outer peripheral surface of drive shaft 6. Each swing cam 9 has a generally triangular cross section, having a cam nose portion radially extending and a cam surface 9a at its lower side. Cam surface 9a of each swing cam 9 includes a base round part that extends around the cylindrical outer surface of camshaft 10, a lump part that extends from the base round part toward the cam nose portion, and a lift part that extends from the lump part to a maximum lift point defined at the leading end of the cam nose portion. That is, under operation, these parts of cam surface 9a operate in sliding contact with an upper surface of the corresponding valve lifter 8 thereby to induce the opening/closing operation of the corresponding intake valve 4 in accordance with a swinging motion of swing cam 9. The cam nose portion of one of swing cams 9 and 9 is linked with one end portion of a below-mentioned link rod 13 with a pivot pin.

The power transmitting mechanism includes a rocker arm 11 that is pivotally disposed about a control shaft 17 positioned above drive shaft 6, a link arm 12 that pivotally connects a first wing portion 11a of rocker arm 11 to drive cam 7, and a link rod 13 that pivotally connects a second wing portion 11b of rocker arm 11 to swing cam 9. Rocker arm 11 has at its middle portion a cylindrical bore in which a below-mentioned control cam 18 is rotatably disposed. First wing portion 11a of rocker arm 11 has a pivot pin 14 through which rocker arm 11 is pivotally connected to a radially projected arm portion 12b of link arm 12. Second wing portion 11b of rocker arm 11 has a pivot pin 15 through which rocker arm 11 is pivotally connected to one end of link rod 13. First and second wing portions 11a and 11b of rocker arm 11 extend radially outward from opposed end portions of the bored middle portion of rocker arm 11. Link arm 12 includes an annular base portion 12a that rotatably receives therein drive cam 7, and the radially projected arm portion 12b that is pivotally connected to first wing portion 11a of rocker arm 11 through pivot pin 14. Link rod 13 is a curved channel member that has an upper end pivotally connected to second wing portion 11b of rocker arm 11 through pivot pin 15, and a lower end pivotally connected to the cam nose portion of swing cam 9 through a pivot pin 16.

Valve event and lift control mechanism 1 includes control shaft 17 that extends in parallel with drive shaft 6 and is rotatably held by bearings, and a control cam 18 for each cylinder, which is secured to control shaft 17 to rotate therewith. As mentioned above, control cam 18 is rotatably disposed in the support hole provided in the middle portion of rocker arm 11. That is, control cam 18 serves as an axis of rotation of rocker arm 11. Control cam 18 is a circular disc that has a center axis displaced or eccentric from the center axis of control shaft 17. More specifically, the circular disc 18 has at an eccentric portion thereof a circular opening through which control shaft 17 passes. For the integral rotation of control cam 18 with control shaft 17, control shaft 17 is secured to the circular opening of control cam 18 through press-fitting or the like.

Drive mechanism 19 generally includes a housing, an electric motor 20 that is connected to one axial end of the housing, and a ball-screw type transmission mechanism 21 that is installed in the housing for transmitting a torque from electric motor 20 to control shaft 17 while reducing the rotation speed. Electric motor 20 is of a proportional DC type. Electric motor 20 is controlled by a controller 22. That is, controller 22 processes various data signals fed thereto, and outputs a control signal to electric motor 20. Ball-screw type transmission mechanism 21 generally includes a ball-screw shaft 23 that extends axially in the housing to be coaxially connected to the output shaft of electric motor 20, a ball nut 24 that is disposed about ball-screw shaft 23 to operatively engage with the same, a lever 25 that is secured to one end of control shaft 17 to radially extend, and a channel-shaped link 26 that pivotally connects lever 25 and ball nut 24. Lever 25 and link 26 thus constitute a transmission mechanism. Ball nut 24 is meshed with ball-screw shaft 23 so that rotation of ball-screw shaft 23 about its axis induces a forward or rearward movement of ball nut 24 along ball-screw shaft 23.

Ball screw shaft 23 is formed with a continuous spiral groove extending around the outer peripheral surface other than the both ends, where the groove has a specific constant width for guiding recirculating balls. Ball nut 24 is also formed with a continuous spiral groove extending around the inner peripheral surface so as to cooperate with ball screw shaft 23 to guide the recirculating balls.

Controller 22 receives data signals from a crank angle sensor 27, an ignition switch, an air flow meter, an accelerator opening sensor, a vehicle speed sensor, a gear position sensor, an engine coolant temperature sensor 31, and an air humidity sensor. The engine speed N (rpm) is determined on the basis of the data signal indicative of the crank angle from crank angle sensor 27. Engine coolant temperature sensor 31 outputs a data signal indicative of an engine temperature T1. The air humidity sensor outputs a data signal indicative of an intake air humidity H1 defined as a humidity in an intake pipe. On the basis of these data signals, controller 22 determines the current state of the engine. A drive shaft angle sensor 28 measures a drive shaft angle defined as the rotational position of drive shaft 6. A control shaft angle sensor 29 measures a control shaft angle defined as the rotational position of control shaft 17. On the basis of the data signals outputted from crank angle sensor 27 and drive shaft angle sensor 28, controller 22 determines the operating position of valve lift phase control mechanism 2, i.e. the relative rotational position of timing sprocket 30 with respect to drive shaft 6. Controller 22 also determines the operating position of valve event and lift control mechanism 1 on the basis of the data signal outputted from control shaft angle sensor 29.

Figure 3A:
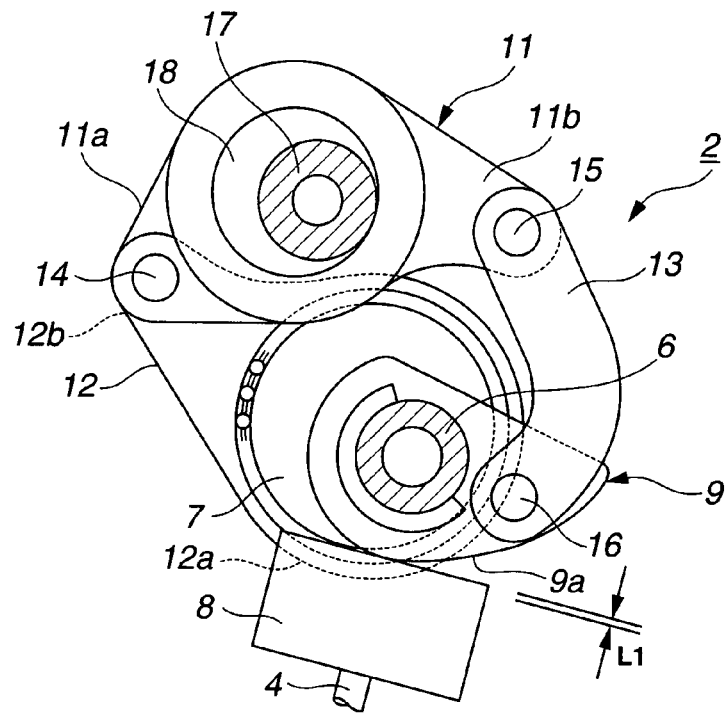
FIGS. 3A and 3B illustrate how the valve event and lift control mechanism according to the first embodiment operates under a condition of small valve lift degree.
Figure 3B:
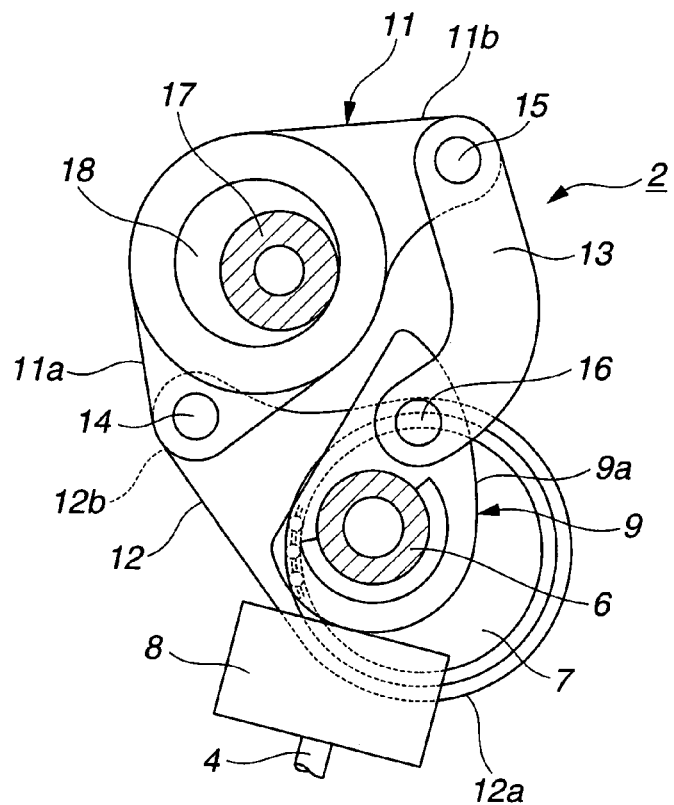
Figure 4A:
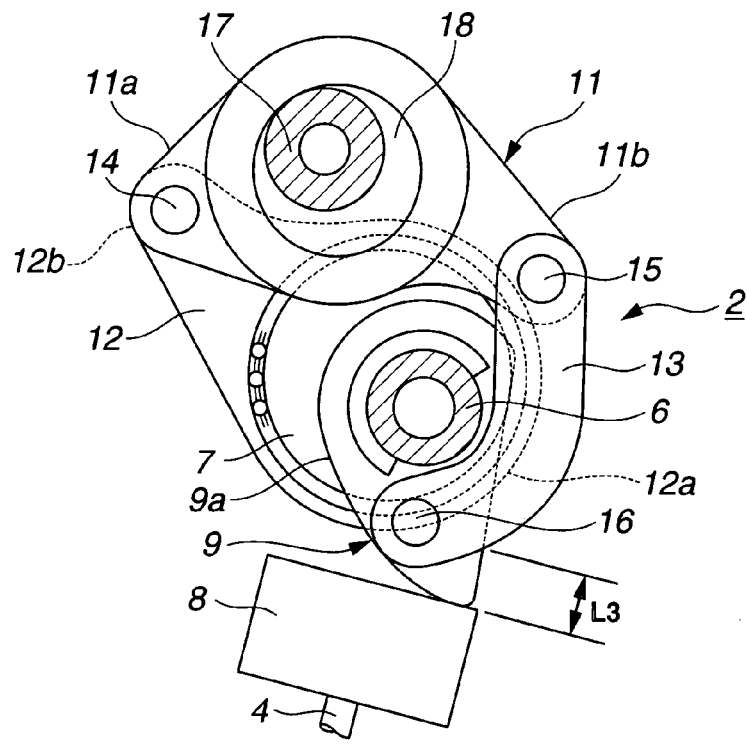
FIGS. 4A and 4B illustrate how the valve event and lift control mechanism according to the first embodiment operates under a condition of large valve lift degree.
Figure 4B:
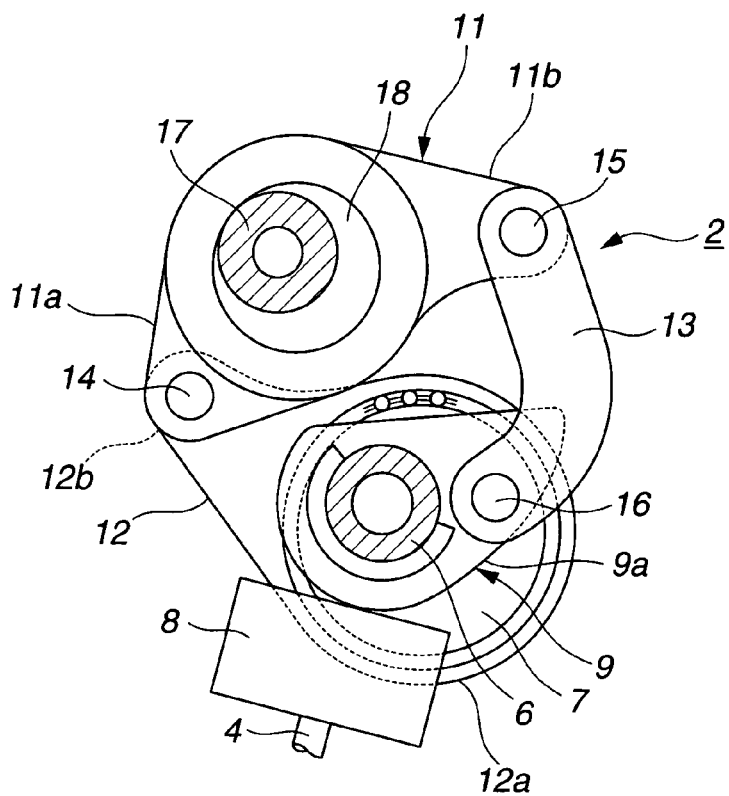

The following describes operations of valve event and lift control mechanism 1 with reference to FIGS. 3A and 3B. Under specific operating conditions, electric motor 22 is driven in accordance with a control signal outputted from controller 22. Upon this, a torque produced by electric motor 20 is transmitted to ball-screw shaft 23 to rotate the same. With this, ball nut 24 is moved axially toward electric motor 20 along ball-screw shaft 23 allowing recirculating balls to run in and along a passage that is defined by and between a spiral thread of ball nut 24 and a spiral thread of ball-screw shaft. During the movement of ball nut 24 on ball-screw shaft 23, lever 25 and thus control shaft 17 are turned clockwise as viewed in the rear view of FIGS. 3A and 3B, where the state as shown in FIGS. 4A and 4B changes to the state as shown in FIGS. 3A and 3B. Upon this, control cam 18 secured to control shaft 17 is turned clockwise about the axis of control shaft 17, moving the thickest cam part thereof upward away from drive shaft 6, and finally control cam 18 takes the angular position as shown in FIGS. 3A and 3B. In other words, under this condition, the whole construction of rocker arm 11 takes a relatively high position. Thus, under this condition, as shown in FIG. 3A, the uppermost position that can be taken by pivot pin 15 provided between second wing portion 13b of rocker arm 11 and the upper end of link rod 13 is a first position that is remote from drive shaft 6. This means that as shown in FIGS. 3A and 3B, link rod 13 and thus swing cam 9 are forced to operate at a position remote from valve lifter 8. Accordingly, when, due to rotation of drive shaft 6, drive cam 7 is rotated in annular base portion 12a of link arm 12, rocker arm 11 is forced to swing reciprocating link rod 13 and swing cam 9 at such a position remote from valve lifter 8. That is, as shown in FIG. 3A and as indicated by (1) in the graph of FIG. 5, under this condition, the valve lift shows a small valve lift height "L1" inducing a retarded opening timing of intake valves 4 and 4, and a small valve operating angle "D1" which is expressed in terms of the drive shaft angle or in terms of half of the crank angle. As mentioned above, the state of conversion of the power transmitting mechanism varies in accordance with the rotational position of control shaft 17.

The foregoing operating position of valve event and lift control mechanism 1 for small valve lift degree is effective for decompressing the cylinder, reducing the valve friction, and improving the fuel efficiency.

On the other hand, under other specific operating conditions, controller 22 controls electric motor 20 to run in a reverse direction. Upon this, ball nut 24 is moved on and along ball-screw shaft 23. That is, ball nut 24 is moved away from electric motor 20 allowing the recirculating balls to run in and along the passage defined by and between the spiral thread of ball nut 24 and spiral thread of ball-screw shaft 23. Accordingly, lever 25 and thus control shaft 17 are turned counterclockwise as viewed in FIGS. 4A and 4B, where the state as shown in FIGS. 3A and 3B changes to the state as shown in FIGS. 4A and 4B. Upon this, control cam 18 is turned counterclockwise about the axis of control shaft 17, moving the thickest cam part thereof downward toward drive shaft 6, and finally control cam 18 takes the angular position as shown in FIGS. 4A and 4B. In other words, in this case, the whole construction of rocker arm 11 takes a relatively low position. Thus, under this condition, as shown in FIG. 4A, the uppermost position that can be taken by pivot pin 15 is a second position that is near drive shaft 6 as compared with the above-mentioned first position. This means that as shown in FIGS. 4A and 4B, link rod 13 and thus swing cam 9 are forced to operate at a position near valve lifter 8. Accordingly, when, due to rotation of drive shaft 6, drive cam 7 is rotated in annular base portion 12a of link arm 12, rocker arm 11 is forced to swing reciprocating link rod 13 and swing cam 9 at such a position near valve lifter 8. That is, as shown in FIG. 4A and as indicated by (3) in the graph of FIG. 5, under this condition, the valve lift shows a large valve lift height "L3" and a large valve operating angle "D3". As shown in the graph of FIG. 5, the closing timing of each intake valve 4 is retarded, while the opening timing thereof is advanced.

The foregoing operating position of valve event and lift control mechanism 1 for large valve lift degree is effective for retarding the intake valve closing timing IVC to be at or near bottom dead center, so as to enhance the effective compression ratio and to improve the flammability in the cylinder during engine cold start. This is effective for increasing the intake air charging efficiency and thus increasing the output torque.

For example, controller 22 controls valve event and lift control mechanism 1 and valve lift phase control mechanism 2 as follows. When the engine is operating in a region of low speed and low load after being warmed up, the valve lift is controlled by valve event and lift control mechanism 1 and valve lift phase control mechanism 2 so that the valve lift height is equal to small value L1 and the valve lift central phase is retarded. This is effective for stabilizing the combustion process because the valve overlap between intake valves 4, 4 and exhaust valves 5, 5 is reduced, and is effective for improving the fuel efficiency because such a small lift degree results in a low level of valve friction. When the engine is operating in a region of middle speed and middle load, the valve lift is controlled by valve event and lift control mechanism 1 and valve lift phase control mechanism 2 so that the valve lift height is equal to middle value L2 and the valve lift central phase is advanced. This is effective for reducing the pumping loss, and thereby improving the fuel efficiency, because the valve overlap between intake valves 4, 4 and exhaust valves 5, 5 is increased. When the engine is operating in a region of high speed and high load, the valve lift is controlled by valve event and lift control mechanism 1 and valve lift phase control mechanism 2 so that the valve lift height is equal to large value L3. This is effective for increasing the intake air charging efficiency and thus increasing the output torque.

Figure 5:
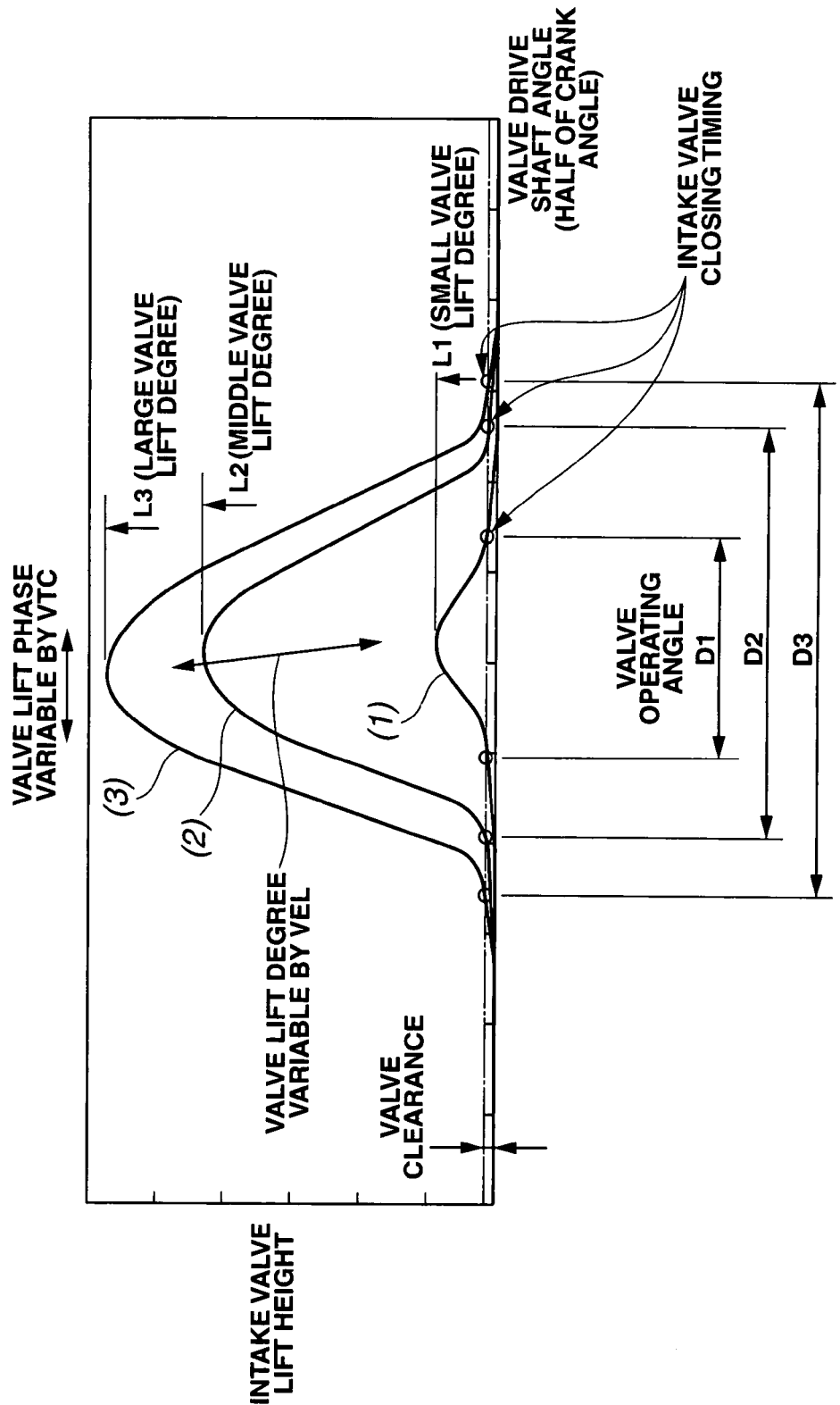
FIG. 5 is a graph showing how the lift height of an intake valve changes with a drive shaft angle under various conditions of valve lift degree which are attained by the valve event and lift control mechanism and the valve lift phase control mechanism.

As described above, valve event and lift control mechanism 1 is capable of varying the valve lift of each intake valve 4 continuously between the small valve lift degree and the large valve lift degree in accordance with the operating state of the engine, in which the valve lift height varies between small value L1 and large value L3, and the valve operating angle also varies between small value D1 and large value D3, as indicated by (1), (2) and (3) in FIG. 5.

As shown in FIG. 2, valve lift phase control mechanism 2 generally includes timing sprocket 30 provided at the front end of drive shaft 6, and a phase control actuator 32 for rotating the timing sprocket 30 with respect to drive shaft 6 within a predetermined angle. Timing sprocket 30 rotates in synchronization with the crankshaft through a timing chain or timing belt.

Controller 22 controls the amount of working fluid supplied to phase control actuator 32 by outputting a control signal to a hydraulic control section. The relative displacement between timing sprocket 30 and drive shaft 6 caused by phase control actuator 32 results in advancing or retarding the central phase of the valve operating angle as shown in FIG. 5. Valve lift phase control mechanism 2 causes no change in the characteristic or shape of the curve indicative of opening of the valve while advancing or retarding the curve entirely. This advance or retard in the valve lift central phase can be implemented continuously. Valve lift phase control mechanism 2 may be driven by other types of actuators such as electric motors or electromagnetic actuators.

Figure 6A:
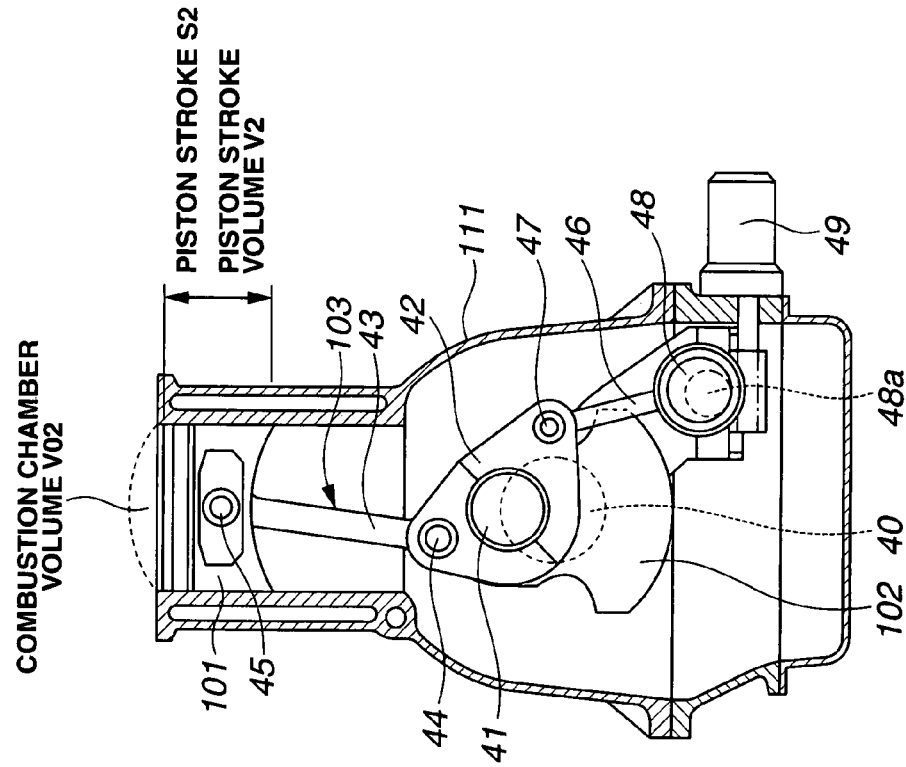
FIGS. 6A and 6B illustrate how a nominal compression ratio control mechanism according to the first embodiment operates.
Figure 6B:
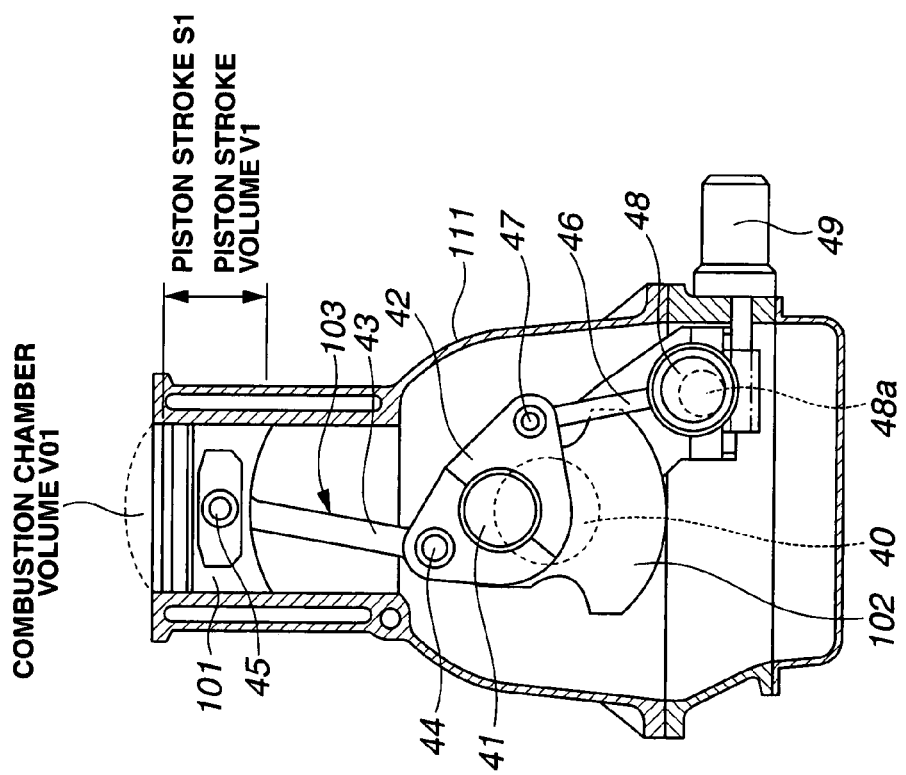

Nominal compression ratio control mechanism 3 is configured to vary the nominal compression ratio $\epsilon_{C0}$. Nominal compression ratio control mechanism 3 may be constructed as disclosed in Japanese Patent Application Publication No. 2002-276446. The entire contents of this Japanese Patent Application Publication No. 2002-276446 are hereby incorporated by reference. As shown in FIGS. 1, 6A and 6B, crankshaft 102 includes a plurality of journals 40 and a plurality of crankpins 41. Crankshaft 102 is rotatably supported at journals 40 on cylinder block 111 through bearings. Each crankpin 41 has an axial center displaced or eccentric with respect to the axial center of journal 40. Lower link 42 is rotatably supported on crankpin 41 of crankshaft 102. Lower link 42 includes two split parts which define therebetween a center bore to which crankpin 41 is fitted. Upper link 43 is pivotally connected at the lower end to one end of lower link 42 through a connecting pin 44, and pivotally connected at the upper end to piston 101 through a piston pin 45. A control link 46 is pivotally connected at the upper end to the other end of lower link 42 through a connecting pin 47, and connected at the lower end to a control shaft 48. Control shaft 48 is rotatably supported on a lower portion of cylinder block 111. Control shaft 48 includes an eccentric cam 48a displaced or eccentric from the center thereof. The lower end of control link 46 is fitted to eccentric cam 48a for rotation. On the basis of the control signal from controller 22, the rotational position of control shaft 48 is controlled by an electric motor referred to as a nominal compression ratio control actuator 49.

Nominal compression ratio control mechanism 3 operates as follows. When control shaft 48 is rotated by nominal compression ratio control actuator 49, the axial center of eccentric cam 48a moves relative to cylinder block 111, so that the lower end of control link 46 moves. This changes the stroke of piston 101, specifically changes at least the position of piston 101 at top dead center. Nominal compression ratio $\epsilon_{C0}$ is thus changed. Nominal compression ratio $\epsilon_{C0}$ is geometrically defined as a ratio of the volumetric capacity of the cylinder at intake bottom dead center with respect to the volumetric capacity at compression top dead center.

FIG. 6A shows a situation where nominal compression ratio $\epsilon_{C0}$ is low, while FIG. 6B shows a situation where nominal compression ratio $\epsilon_{C0}$ is high. Nominal compression ratio $\epsilon_{C0}$ is continuously variable. Nominal compression ratio $\epsilon_{C0}$ is expressed by the following equation:

$$\epsilon_{C0}=(V0+V)/V0=V/V0+1$$

where V0 represents the combustion chamber volume defined as the volumetric capacity of the cylinder at compression top dead center, and V represents the piston stroke volume.

Nominal compression ratio $\epsilon_{C0}$ under condition of FIG. 6A is assumed to be equal to V1/V01+1, while nominal compression ratio $\epsilon_{C0}$ under condition of FIG. 6B is assumed to be equal to V2/V02+1. Because V1 is nearly equal to V2, and V01 is larger than V02, nominal compression ratio $\epsilon_{C0}$ under condition of FIG. 6B is larger than under condition of FIG. 6A.

On the other hand, nominal expansion ratio $\epsilon_{E0}$ is geometrically defined as a ratio of the volumetric capacity of the cylinder at expansion bottom dead center with respect to the volumetric capacity at compression top dead center. Nominal expansion ratio $\epsilon_{E0}$ is constantly equal to nominal compression ratio $\epsilon_{C0}$, because the volumetric capacity of the cylinder at expansion bottom dead center is equal to the volumetric capacity of the cylinder at intake bottom dead center.

Nominal compression ratio control mechanism 3 can allow piston 101 to implement its stroke with characteristics near simple harmonic oscillation, when the dimension of the links in nominal compression ratio control mechanism 3 are suitably determined. Such characteristics of piston stroke are advantageous in terms of noise. In this case, the piston speed near top dead center is lower by 20% than in typical single-link type piston-crank mechanisms. This is advantageous in terms of generation and growth of an initial core of flame under condition that the combustion rate is low, especially under condition that the engine is in a cold condition.

Effective compression ratio $\epsilon_C$, which is defined as an indicator indicative of how the intake air is compressed, depends at least on nominal compression ratio Eco, and intake valve closing timing IVC. Actual compression in the cylinder starts after intake valves 4, 4 are closed. That is, a change in intake valve closing timing IVC results in a change in the amount of the intake air entering the cylinder. Therefore, effective compression ratio $\epsilon_C$ varies according to intake valve closing timing IVC. Even when nominal compression ratio $\epsilon_{C0}$ is high, effective compression ratio $\epsilon_C$ is reduced below nominal compression ratio $\epsilon_{C0}$ by advancing the intake valve closing timing IVC away from bottom dead center. Change of intake valve closing timing IVC may be generally expressed as "change of effective intake stroke".

As described above, effective compression ratio $\epsilon_C$ decreases as intake valve closing timing IVC advances away from bottom dead center. On the other hand, effective compression ratio $\epsilon_C$ increases as intake valve closing timing IVC retards toward bottom dead center. When effective compression ratio $\epsilon_C$ is excessively high at or after the first rotation of the crankshaft during engine start, there is a possibility that vibrations and preignition occur due to excessively high compression in the cylinder. On the other hand, when effective compression ratio $\epsilon_C$ is excessively low, there is a possibility that the combustion in the cylinder falls unstable due to inadequate compression of the intake air. Accordingly, effective compression ratio $\epsilon_C$ is controlled suitably by the start control apparatus as described in detail below.

Figure 7:
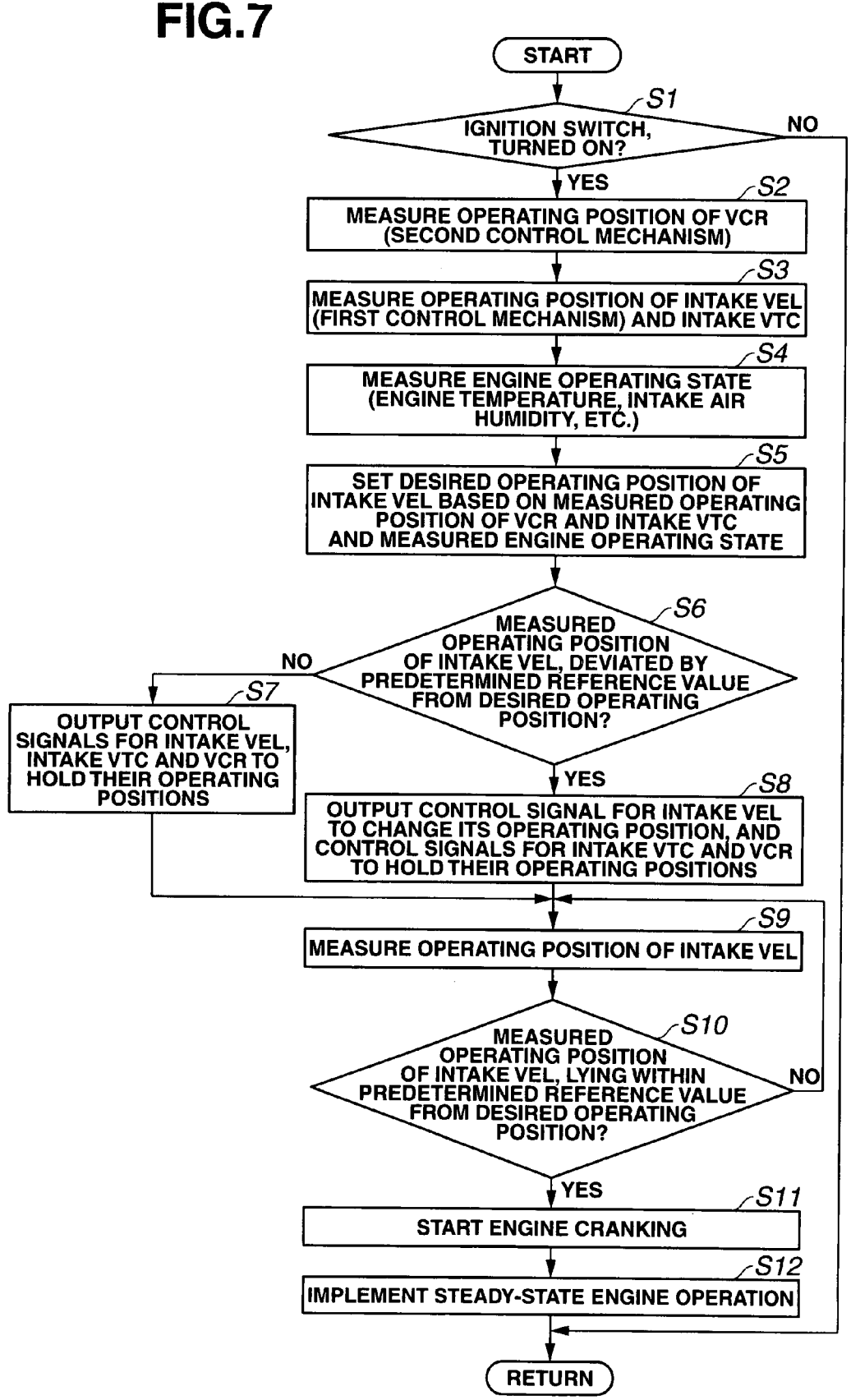
FIG. 7 is a flow chart showing a control process to be performed by a controller according to the first embodiment.
Figure 8:
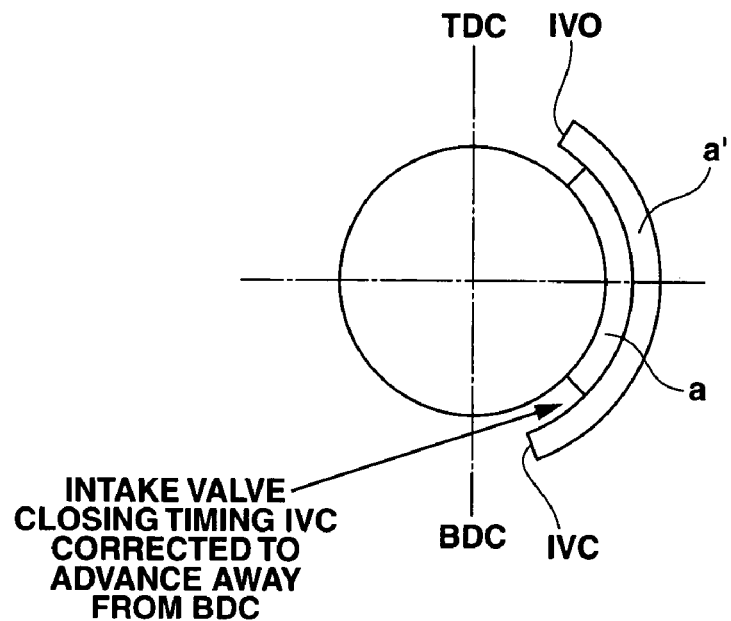
FIG. 8 illustrates an example of how the intake valve closing timing is corrected in accordance with the first embodiment.
Figure 9:
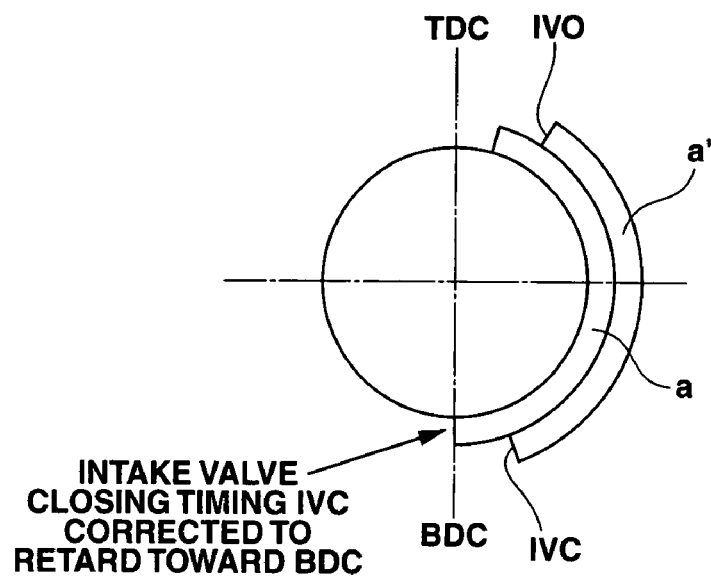
FIG. 9 illustrates another example of how the intake valve closing timing is corrected in accordance with the first embodiment.

The following describes with reference to FIG. 7 how controller 22 is configured to control valve event and lift control mechanism 1, valve lift phase control mechanism 2, and nominal compression ratio control mechanism 3 for controlling the effective compression ratio $\epsilon_C$. Entering the control process shown in FIG. 7, controller 22 first proceeds to Step S1.

At Step S1, controller 22 judges whether or not the ignition switch is turned on. When judging that the ignition switch is not turned on, then controller 22 returns from the present control process. On the other hand, when judging that the ignition switch is turned on, then controller 22 proceeds to Step S2.

At Step S2, controller 22 measures a current value of nominal compression ratio $\epsilon_{C0}$ that is controlled and defined by nominal compression ratio control mechanism 3, and then proceeds to Step S3.

At Step S3, controller 22 measures a current actual operating position of valve event and lift control mechanism 1 and a current actual operating position of valve lift phase control mechanism 2 on the basis of data signals outputted from the associated sensors, and then proceeds to Step S4.

At Step S4, controller 22 measures an engine operating state on the basis of the data signals outputted from the associated sensors wherein the engine operating state includes engine temperature T1 and intake air humidity H1, and then proceeds to Step S5.

At Step S5, controller 22 sets a desired operating position of valve event and lift control mechanism 1 on the basis of the measured operating position of nominal compression ratio control mechanism 3 (the measured value of nominal compression ratio $\epsilon_{C0}$), the measured operating position of valve lift phase control mechanism 2, and the engine operating state, and then proceeds to Step S6. Specifically, controller 22 operates at Step S5 as follows. When judging engine temperature T1 as being low before engine cranking, controller 22 sets intake valve closing timing IVC to approach bottom dead center with decrease in nominal compression ratio $\epsilon_{C0}$, that is, sets intake valve closing timing IVC to deviate from bottom dead center with increase in nominal compression ratio $\epsilon_{C0}$. For example, when nominal compression ratio $\epsilon_{C0}$ is relatively high, then controller 22 sets a control signal for valve event and lift control mechanism 1 in such a manner to allow valve event and lift control mechanism 1 to vary the lift degree of intake valves 4, 4 from a relatively large lift degree as indicated by "a'" in FIG. 8 to a relatively small lift degree indicated by "a" in FIG. 8 so that intake valve closing timing IVC advances away from bottom dead center. On the other hand, when nominal compression ratio $\epsilon_{C0}$ is relatively low, then controller 22 sets the control signal for valve event and lift control mechanism 1 in such a manner to allow valve event and lift control mechanism 1 to vary the lift degree of intake valves 4, 4 from a relatively small lift degree as indicated by "a"' in FIG. 9 to a relatively large lift degree indicated by "a" in FIG. 9 so that intake valve closing timing IVC retards toward bottom dead center.

Moreover, controller 22 further corrects the desired operating position of valve event and lift control mechanism 1 as follows. This is implemented in consideration of the operating position of valve lift phase control mechanism 2, engine temperature T1, and intake air humidity H1. First, as described above, intake valve closing timing IVC varies in accordance with both of the operating position of valve event and lift control mechanism 1 and the operating position of valve lift phase control mechanism 2. Accordingly, controller 22 controls valve event and lift control mechanism 1 so as to attain a desired valve lift degree, and to set intake valve closing timing IVC as desired, on the basis of the measured operating position of valve lift phase control mechanism 2. Second, when engine temperature T1 is high, the combustion tends to cause a preignition, and the level of engine friction is low so that the desired amount of intake air is small. Accordingly, controller 22 corrects intake valve closing timing IVC to advance away from bottom dead center with an increase in engine temperature T1. Third, when intake air humidity H1 is high, the desired amount (volume) of intake air is large. Accordingly, controller 22 corrects intake valve closing timing IVC to retard toward bottom dead center with an increase in intake air humidity H1. Controller 22 thus computes a final desired operating position of valve event and lift control mechanism 1.

At Step S6, controller 22 judges whether or not the current actual operating position of valve event and lift control mechanism 1 is deviated by more than a predetermined reference value from the desired operating position. When judging that the current actual operating position of valve event and lift control mechanism 1 is not deviated by more than the predetermined reference value from the desired operating position, then controller 22 proceeds to Step S7. On the other hand, when judging that the current actual operating position of valve event and lift control mechanism 1 is deviated by more than the predetermined reference value from the desired operating position, then controller 22 proceeds to Step S8.

At Step S7, controller 22 outputs control signals to valve event and lift control mechanism 1, valve lift phase control mechanism 2, and nominal compression ratio control mechanism 3 in such a manner to hold their respective current operating positions, and then proceeds to Step S9.

At Step S8, controller 22 outputs a control signal to valve event and lift control mechanism 1 in such a manner to conform to the desired operating position, and outputs control signals to valve lift phase control mechanism 2 and nominal compression ratio control mechanism 3 in such a manner to hold their respective current operating positions, and then proceeds to Step S9.

At Step S9, controller 22 measures again the current actual operating position of valve event and lift control mechanism 1, and then proceeds to Step S10.

At Step S10, controller 22 judges whether or not the current actual operating position of valve event and lift control mechanism 1 is within the predetermined reference value from the desired operating position. When judging that the current actual operating position of valve event and lift control mechanism 1 is not within the predetermined reference value from the desired operating position, then controller 22 proceeds back to Step S9. On the other hand, when judging that the current actual operating position of valve event and lift control mechanism 1 is within the predetermined reference value from the desired operating position, then controller 22 proceeds to Step S11.

At Step S11, controller 22 energizes starter motor 107 so as to start a cranking operation, and then proceeds to Step S12.

Just after the start of cranking operation at Step S11, at Step S12, controller 22 outputs control signals to a fuel injector and ignition plug 105 to implement steady-state engine operation, and then returns from the present control process.

As described above, the start control apparatus according to the first embodiment includes: a first control mechanism arranged to vary at least one of a compression ratio and an expansion ratio of a cylinder of the internal combustion engine, the first control mechanism including a first actuator arranged to receive a first control signal, and to control at least one of the compression ratio and the expansion ratio in accordance with the first control signal; a second control mechanism arranged to vary at least one of the compression ratio and the expansion ratio, the second control mechanism including a second actuator arranged to receive a second control signal, and to control at least one of the compression ratio and the expansion ratio in accordance with the second control signal; and a controller connected to the first and second control mechanisms for outputting the first and second control signals, the controller being configured to: measure a state of the internal combustion engine before cranking the internal combustion engine, the state including a state of the second control mechanism; set the first control signal in accordance with the measured state of the internal combustion engine; and output the set first control signal to the first control mechanism before cranking the internal combustion engine. According to the first embodiment, valve event and lift control mechanism 1 serves as the first control mechanism, while nominal compression ratio control mechanism 3 serves as the second control mechanism.

The foregoing control process serves for smooth engine starting operation. Because controller 22 is configured to output a control signal to valve event and lift control mechanism 1 before engine cranking, intake valve closing timing IVC is suitably controlled according to nominal compression ratio $\epsilon_{C0}$ at or before the initial stage of engine cranking. This is effective for allowing the crankshaft to smoothly start to rotate at the initial stage of engine cranking, suppressing vibrations and preignition during engine start, and thereby achieving smooth engine start with stable combustion. This serves for enhancing the exhaust emission performance of the engine.

Figure 10:
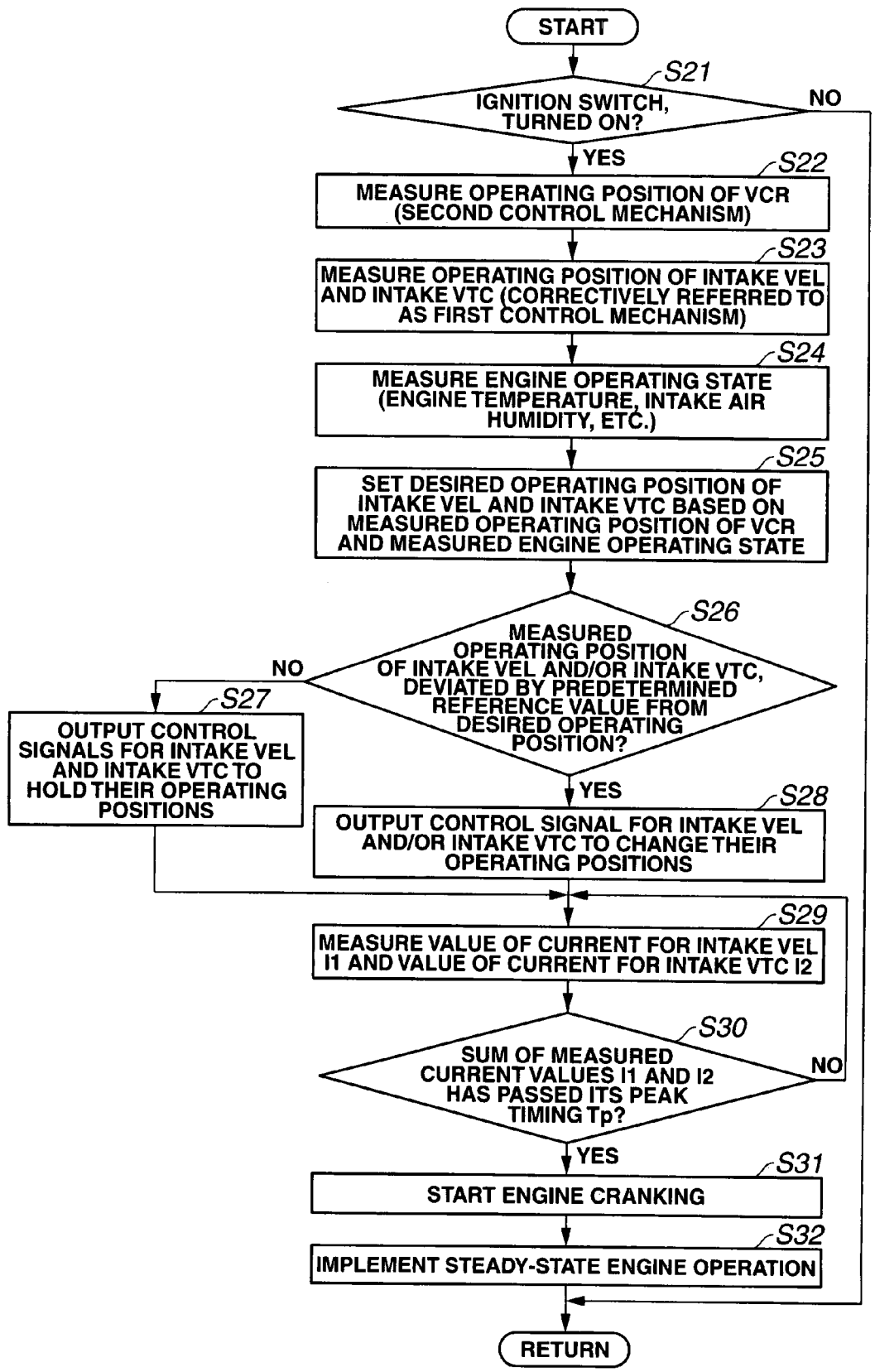
FIG. 10 is a flow chart showing a control process to be performed by a controller according to a second embodiment of the present invention.

The following describes a start control apparatus for an internal combustion engine according to a second embodiment of the present invention with reference to FIG. 10. In this embodiment, the first control mechanism is assumed to include valve event and lift control mechanism 1 and valve lift phase control mechanism 2, while the second control mechanism is assumed to include nominal compression ratio control mechanism 3. The following describes with reference to FIG. 10 how controller 22 is configured to control valve event and lift control mechanism 1, valve lift phase control mechanism 2, and nominal compression ratio control mechanism 3 for controlling the effective compression ratio $\epsilon_C$. Entering the control process shown in FIG. 10, controller 22 first proceeds to Step S21.

At Step S21, controller 22 judges whether or not the ignition switch is turned on. When judging that the ignition switch is not turned on, then controller 22 returns from the present control process. On the other hand, when judging that the ignition switch is turned on, then controller 22 proceeds to Steps S22 to S24. At Steps S22 to S24, as in the first embodiment, controller 22 measures a current value of nominal compression ratio $\epsilon_{C0}$ that is controlled and defined by nominal compression ratio control mechanism 3, measures a current actual operating position of valve event and lift control mechanism 1 and a current actual operating position of valve lift phase control mechanism 2 on the basis of data signals outputted from the associated sensors, and measures an engine operating state on the basis of the data signals outputted from the associated sensors wherein the engine operating state includes engine temperature T1 and intake air humidity H1, and then proceeds to Step S25.

Figure 11:
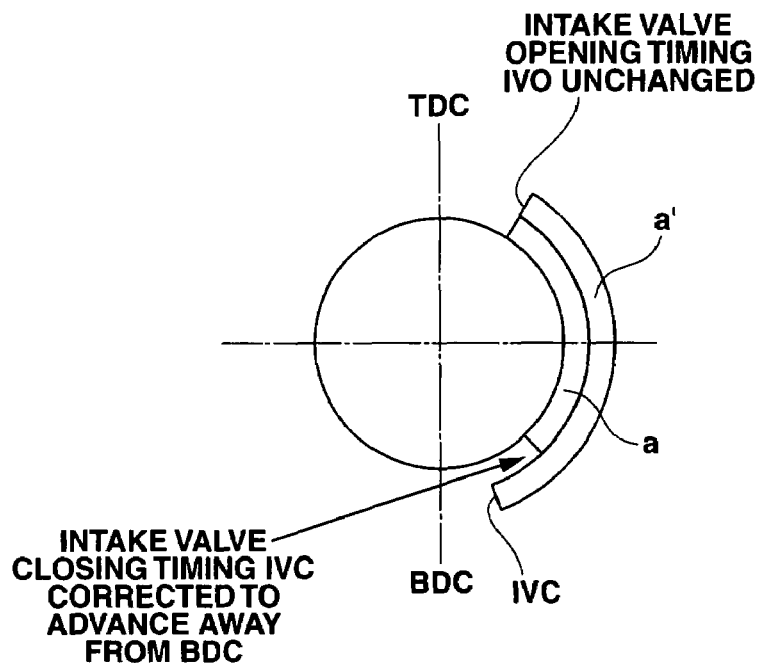
FIG. 11 illustrates an example of how the intake valve closing timing is corrected in accordance with the second embodiment.
Figure 12:
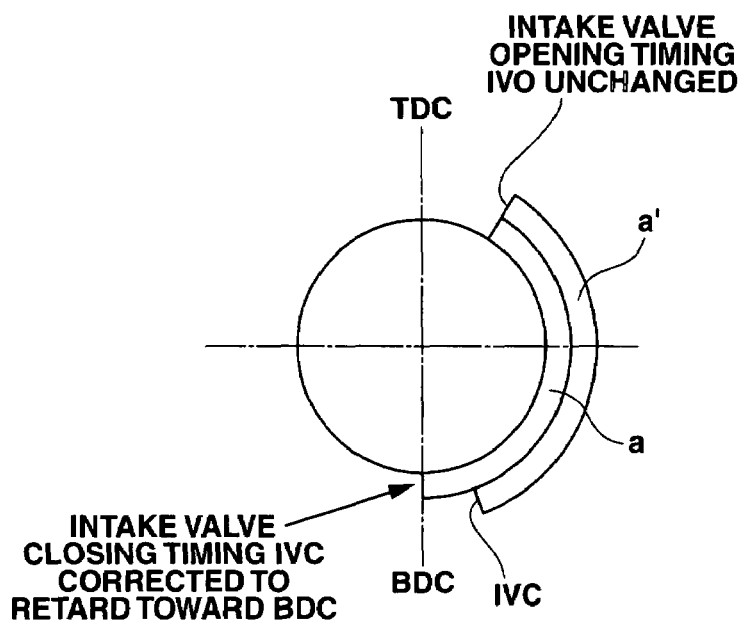
FIG. 12 illustrates another example of how the intake valve closing timing is corrected in accordance with the second embodiment.

At Step S25, controller 22 sets a desired operating position of valve event and lift control mechanism 1 and a desired operating position of valve lift phase control mechanism 2 on the basis of the measured operating position of nominal compression ratio control mechanism 3 (the measured value of nominal compression ratio $\epsilon_{C0}$), and the engine operating state, and then proceeds to Step S26. Specifically, controller 22 operates at Step S25 as follows. For example, when nominal compression ratio $\epsilon_{C0}$ is relatively high, then controller 22 sets a control signal for valve event and lift control mechanism 1 in such a manner to allow valve event and lift control mechanism 1 to vary the lift degree of intake valves 4, 4 from a relatively large lift degree as indicated by "a'" in FIG. 11 to a relatively small lift degree indicated by "a" in FIG. 11 so that intake valve closing timing IVC advances away from bottom dead center. Simultaneously, controller 22 sets a control signal for valve lift phase control mechanism 2 in such a manner to allow valve lift phase control mechanism 2 to vary the central phase of the valve operating angle so that intake valve opening timing IVO is held substantially constant. On the other hand, when nominal compression ratio $\epsilon_{C0}$ is relatively low, then controller 22 sets the control signal for valve event and lift control mechanism 1 in such a manner to allow valve event and lift control mechanism 1 to vary the lift degree of intake valves 4, 4 from a relatively small lift degree as indicated by "a'" in FIG. 12 to a relatively large lift degree indicated by "a" in FIG. 12 so that intake valve closing timing IVC retards toward bottom dead center. Simultaneously, controller 22 sets the control signal for valve lift phase control mechanism 2 in such a manner to allow valve lift phase control mechanism 2 to vary the central phase of the valve operating angle so that intake valve opening timing IVO is held substantially constant.

If intake valve opening timing IVO is set to be later than desired, intake valves 4, 4 start to open when piston 101 is traveling downward so as to cause a negative pressure in the cylinder. This tends to strengthen incylinder gas motion, and thereby to cause preignition. On the other hand, if intake valve opening timing IVO is set to be earlier than desired, the negative pressure is low when intake valves 4, 4 start to open. This tends to reduce incylinder gas motion, and thereby to adversely affect the fuel efficiency.

Because controller 22 controls both of valve event and lift control mechanism 1 and valve lift phase. Control mechanism 2 in order to control effective compression ratio $\epsilon_C$, the desired change of the operating position of valve event and lift control mechanism 1 is smaller than in the first embodiment. This is effective for quickly completing the control of effective compression ratio $\epsilon_C$.

According to the foregoing control of effective compression ratio $\epsilon_C$, when effective compression ratio $\epsilon_C$ is undesirably low, then intake valve closing timing IVC is retarded and intake valve opening timing IVO is maintained to be relatively late. This is effective for increasing effective compression ratio $\epsilon_C$ to improve the fuel efficiency, and maintaining strong incylinder gas motion. In view of this point, the second embodiment is more effective than the first embodiment.

According to the foregoing control process, intake valve opening timing IVO is held constant while intake valve closing timing IVC is advanced or retarded. Alternatively, when effective compression ratio $\epsilon_C$ is relatively high, intake valve opening timing IVO may be advanced in order to suppress incylinder gas motion and thereby to suppress preignition. On the other hand, when effective compression ratio $\epsilon_C$ is relatively low, intake valve opening timing IVO may be retarded in order to enhance incylinder gas motion and thereby to improve the fuel efficiency.

At Step S26, controller 22 judges whether or not at least one of the current actual operating position of valve event and lift control mechanism 1 and the current actual operating position of valve lift phase control mechanism 2 is deviated by more than a predetermined reference value from the desired operating position. When judging that both of the current actual operating position of valve event and lift control mechanism 1 and the current actual operating position of valve lift phase control mechanism 2 are not deviated by more than the predetermined reference value from the desired operating position, then controller 22 proceeds to Step S27. On the other hand, when judging that at least one of the current actual operating position of valve event and lift control mechanism 1 and the current actual operating position of valve lift phase control mechanism 2 is deviated by more than the predetermined reference value from the desired operating position, then controller 22 proceeds to Step S28.

At Step S27, controller 22 outputs control signals to valve event and lift control mechanism 1, valve lift phase control mechanism 2, and nominal compression ratio control mechanism 3 in such a manner to hold their respective current operating positions, and then proceeds to Step S29.

At Step S28, controller 22 outputs a control signal to at least one of valve event and lift control mechanism 1 and valve lift phase control mechanism 2 in such a manner to conform to the desired operating position, and then proceeds to Step S29.

At Step S29, controller 22 measures a current value I1 of a current flowing through valve event and lift control mechanism 1 and a current value I2 of a current flowing through valve lift phase control mechanism 2, and then proceeds to Step S30.

At Step S30, controller 22 judges whether or not the sum of current values I1 and I2 has passed a peak timing Tp. When judging that the sum of current values I1 and I2 has not passed the peak timing Tp, then controller 22 proceeds back to Step S29. On the other hand, when judging that the sum of current values I1 and I2 has passed the peak timing Tp, then controller 22 proceeds to Step S31.

At Step S31, controller 22 energizes starter motor 107 so as to start a cranking operation, and then proceeds to Step S32.

Just after the start of cranking operation at Step S31, at Step S32, controller 22 outputs control signals to a fuel injector and ignition plug 105 to implement steady-state engine operation, and then returns from the present control process.

Figure 13:
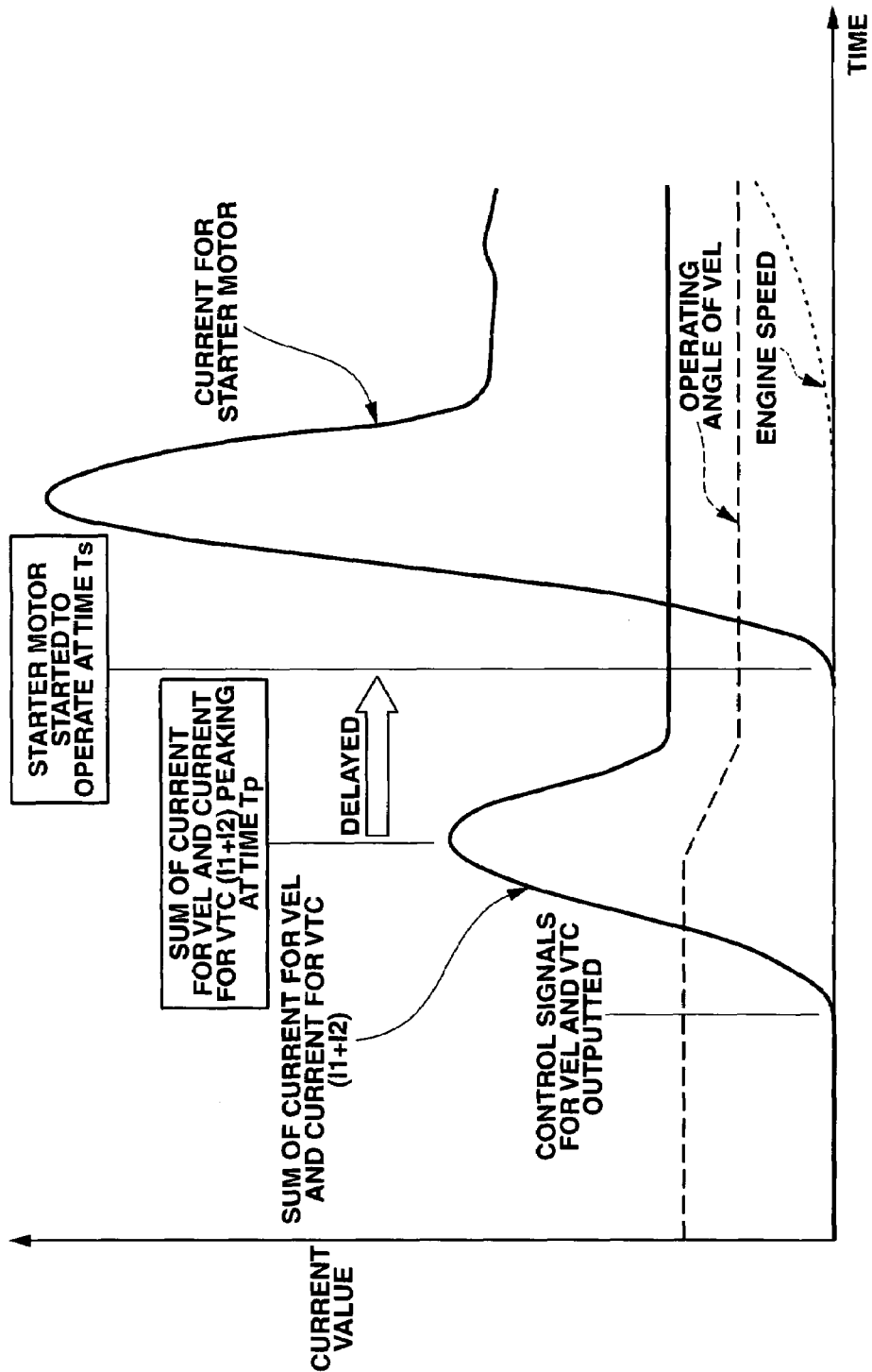
FIG. 13 is a graph how a motor current supplied to the valve event and lift control mechanism and the valve lift phase control mechanism and a motor current supplied to a starter motor change with time in accordance with the second embodiment.

According to the foregoing control process, starter motor 107 for cranking is energized after peak timing Tp as shown in FIG. 13. This is effective for reducing a load applied to the battery, because the current supplied to starter motor 107 has a peak after the sum of current values I1 and I2 has passed the peak timing Tp. This serves for preferable engine startability.

Figure 14:
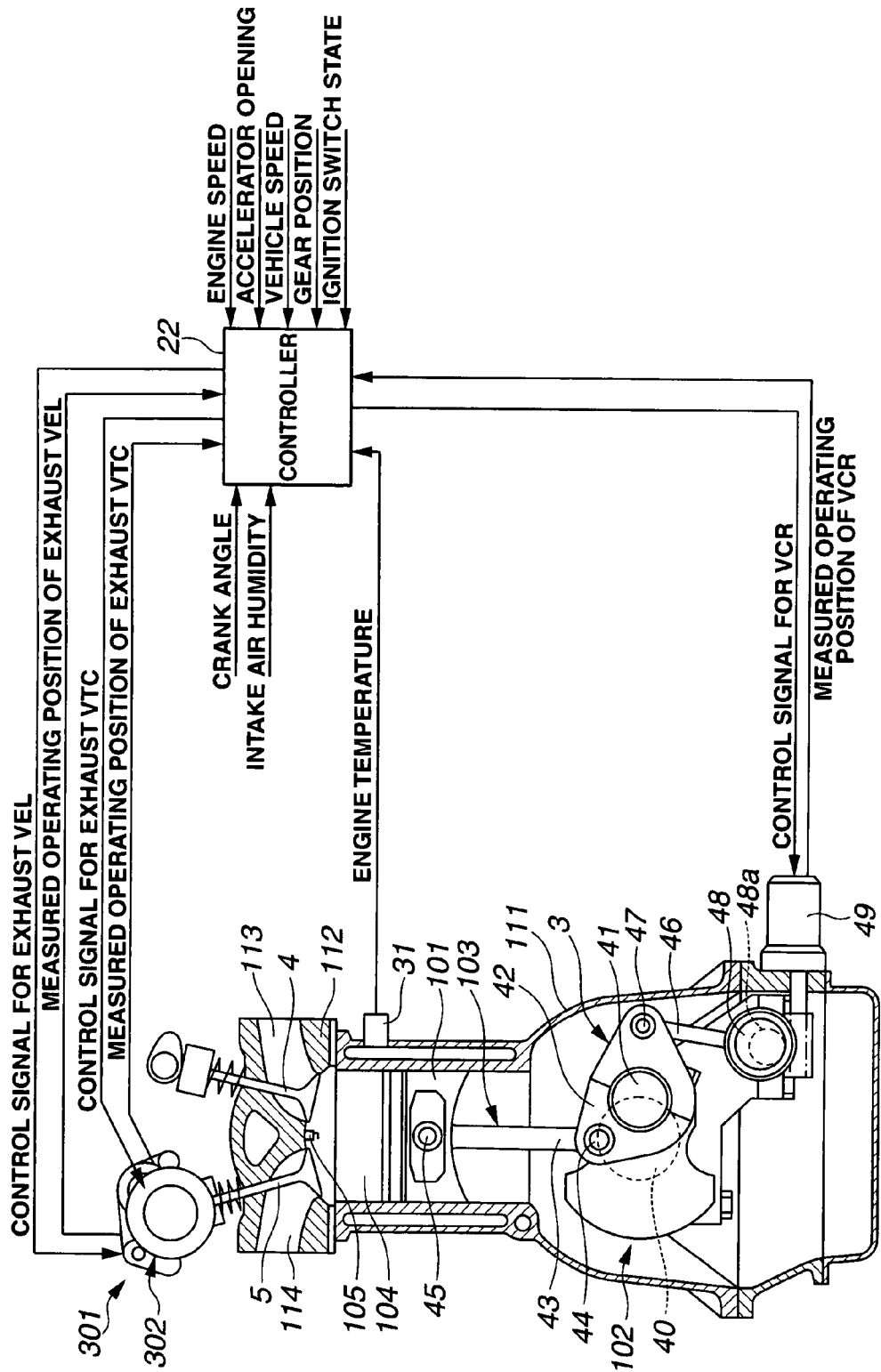
FIG. 14 is a schematic diagram showing an internal combustion engine with a start control apparatus according to a third embodiment of the present invention.

The following describes a start control apparatus for an internal combustion engine according to a third embodiment of the present invention with reference to FIGS. 14 to 17. As shown in FIG. 14, a valve event and lift control mechanism 301 and a valve lift phase control mechanism 302 are provided at exhaust valves 5, 5 for controlling the exhaust valve opening timing EVO, and controlling the effective expansion ratio $\epsilon_E$. No valve event and lift control mechanism and no valve lift phase control mechanism are provided at intake valves 4, 4. Valve event and lift control mechanism 301 and valve lift phase control mechanism 302 are constructed similarly as valve event and lift control mechanism 1 and valve lift phase control mechanism 2 as shown in FIG. 2, respectively. The start control apparatus according to the third embodiment includes nominal compression ratio control mechanism 3 which serves as a nominal expansion ratio control mechanism for controlling the nominal expansion ratio $\epsilon_{E0}$.

The other part of the construction of the engine is the same as in the first embodiment. In the third embodiment, the first control mechanism is assumed to include valve lift phase control mechanism 302, while the second control mechanism is assumed to include nominal compression ratio control mechanism 3.

Effective expansion ratio $\epsilon_E$, which is defined as an indicator indicative of how the burned gas is expanded, depends at least on nominal expansion ratio $\epsilon_{E0}$, and exhaust valve opening timing EVO. Actual expansion in the cylinder continues until exhaust valves 5, 5 are opened. Therefore, effective expansion ratio $\epsilon_E$ varies according to exhaust valve opening timing EVO. Even when nominal expansion ratio $\epsilon_{E0}$ is high, effective expansion ratio $\epsilon_E$ is reduced below nominal expansion ratio $\epsilon_{E0}$ by advancing the exhaust valve opening timing EVO away from bottom dead center. Change of exhaust valve opening timing EVO may be generally expressed as "change of effective expansion stroke".

When nominal expansion ratio $\epsilon_{E0}$ is relatively high, the effective engine work is relatively large so that the exhaust temperature is relatively low, and so that it takes much time to activate an exhaust purifier. This adversely affects the exhaust emission performance at engine start.

Figure 15:
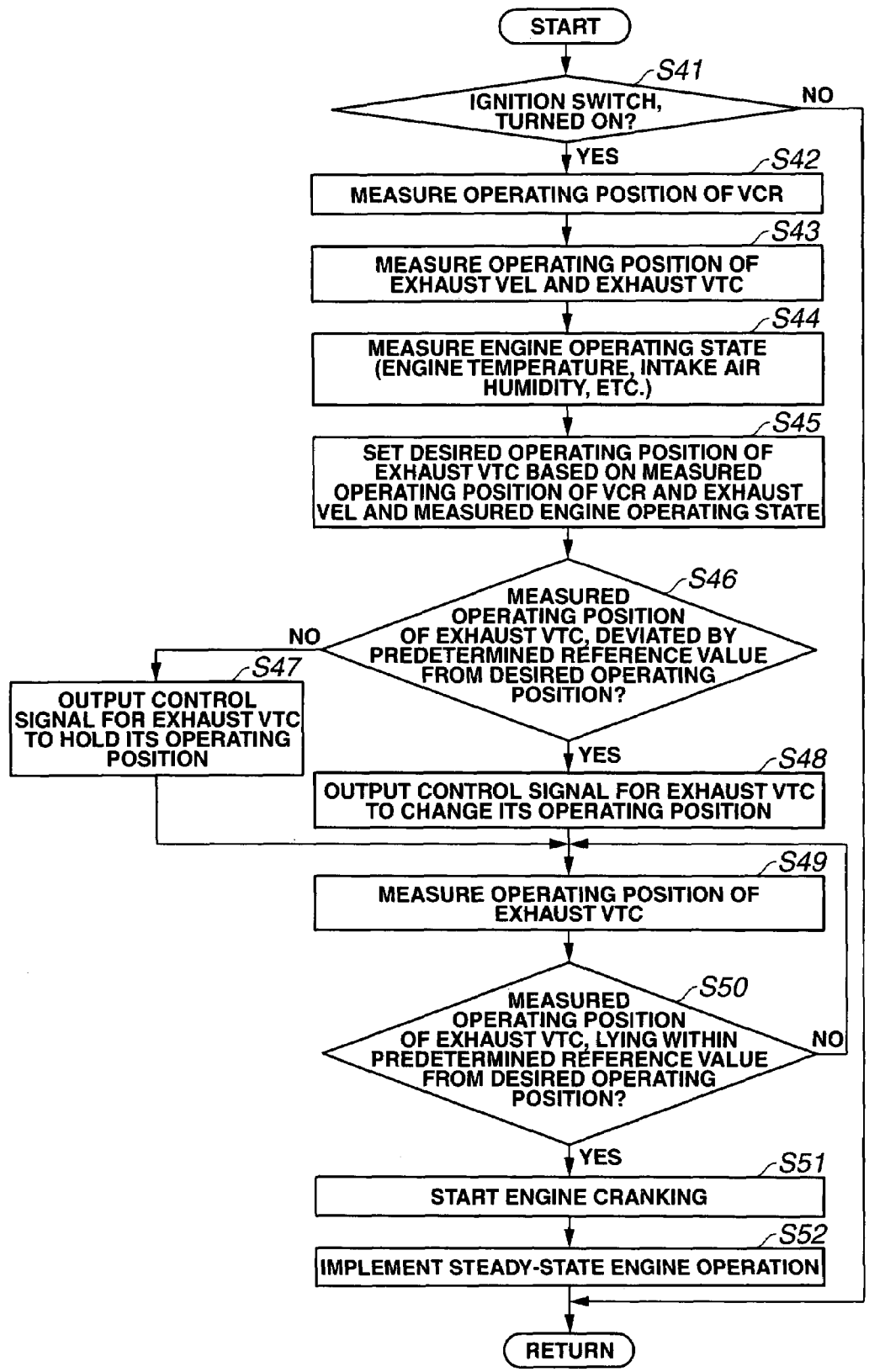
FIG. 15 is a flow chart showing a control process to be performed by a controller according to the third embodiment.
Figure 16:
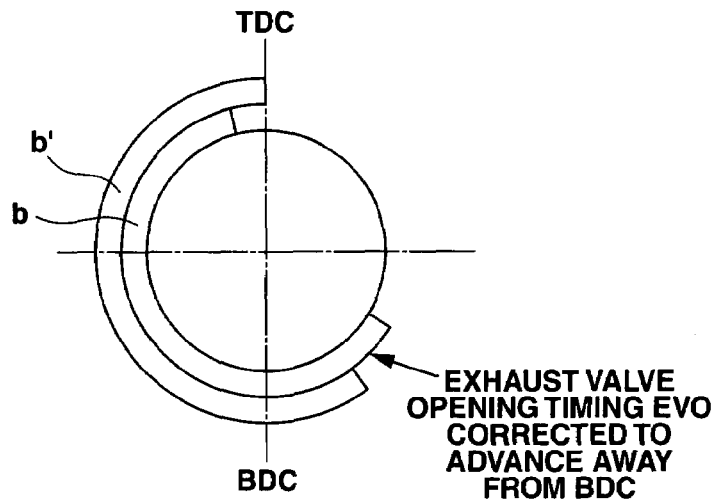
FIG. 16 illustrates an example of how the exhaust valve opening timing is corrected in accordance with the third embodiment.
Figure 17:
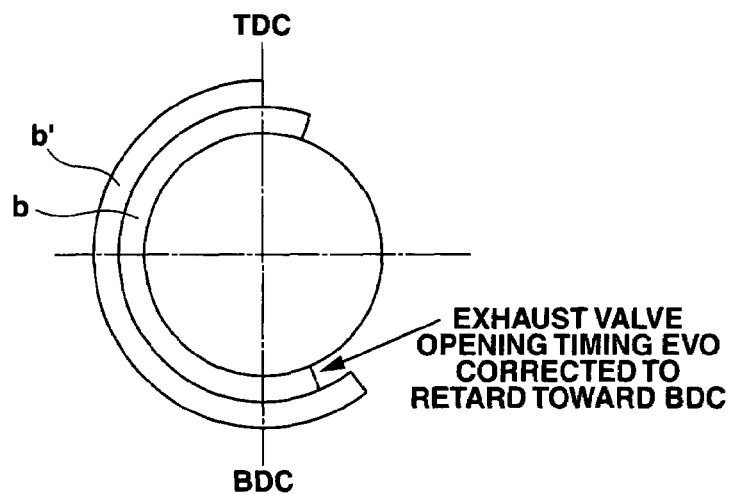
FIG. 17 illustrates another example of how the exhaust valve opening timing is corrected in accordance with the third embodiment.

The following describes with reference to FIG. 15 how controller 22 is configured to control valve event and lift control mechanism 301, valve lift phase control mechanism 302, and nominal compression ratio control mechanism 3 for controlling the effective expansion ratio $\epsilon_E$. Entering the control process shown in FIG. 15, controller 22 first proceeds to Step S41.

At Step S41, controller 22 judges whether or not the ignition switch is turned on. When judging that the ignition switch is not turned on, then controller 22 returns from the present control process. On the other hand, when judging that the ignition switch is turned on, then controller 22 proceeds to Steps S42 to S44. At Steps S42 to S44, controller 22 measures a current value of nominal expansion ratio $\epsilon_{E0}$ that is controlled and defined by nominal compression ratio control mechanism 3, measures a current actual operating position of valve event and lift control mechanism 301 and a current actual operating position of valve lift phase control mechanism 302 on the basis of data signals outputted from the associated sensors, and measures an engine operating state on the basis of the data signals outputted from the associated sensors wherein the engine operating state includes engine temperature T1 and intake air humidity H1, and then proceeds to Step S45.

At Step S45, controller 22 sets a desired operating position of valve lift phase control mechanism 302 on the basis of the measured operating position of nominal compression ratio control mechanism 3 (the measured value of nominal compression ratio $\epsilon_{C0}$), the measured operating position of valve event and lift control mechanism 301, and the engine operating state, and then proceeds to Step S46. Specifically, controller 22 operates at Step S45 as follows. When judging engine temperature T1 as being low before engine cranking, controller 22 sets exhaust valve opening timing EVO to advance from bottom dead center with increase in nominal expansion ratio $\epsilon_{E0}$. When nominal expansion ratio $\epsilon_{E0}$ is relatively high, then controller 22 sets a control signal for valve lift phase control mechanism 302 in such a manner to allow valve lift phase control mechanism 302 to vary the central phase of the valve operating angle of exhaust valves 5, 5 from a relatively late timing as indicated by "b'" in FIG. 16 to a relatively early timing as indicated by "b" in FIG. 16 so that exhaust valve opening timing EVO advances away from bottom dead center. On the other hand, when nominal expansion ratio $\epsilon_{E0}$ is relatively low, then controller 22 sets the control signal for valve lift phase control mechanism 302 in such a manner to allow valve lift phase control mechanism 302 to vary the central phase of the valve operating angle of exhaust valves 5, 5 from a relatively early timing as indicated by "b'" in FIG. 17 to a relatively late timing as indicated by "b" in FIG. 17 so that exhaust valve opening timing EVO retards toward bottom dead center.

If exhaust valve opening timing EVO is set to be relatively early, the temperature of the incylinder burned gas is not fully reduced when exhaust valves 5, 5 are opened. That is, effective expansion ratio $\epsilon_E$ is reduced. This is effective for increasing the exhaust gas temperature, and thereby improving the exhaust emission performance.

On the other hand, if exhaust valve opening timing EVO is set to be relatively late, effective expansion ratio $\epsilon_E$ is increased. This is effective for increasing the effective engine work, and stabilizing the combustion process in the cylinder.

Moreover, controller 22 further corrects exhaust valve opening timing EVO on the basis of the engine operating state. For example, when engine temperature T1 is relatively low, controller 22 corrects exhaust valve opening timing EVO to advance away from bottom dead center with a decrease in engine temperature T1. This is effective for reducing the effective expansion ratio $\epsilon_E$, and increasing the exhaust gas temperature.

At Step S46, controller 22 judges whether or not the current actual operating position of valve lift phase control mechanism 302 is deviated by more than a predetermined reference value from the desired operating position. When judging that the current actual operating position of valve lift phase control mechanism 302 is not deviated by more than the predetermined reference value from the desired operating position, then controller 22 proceeds to Step S47. On the other hand, when judging that the current actual operating position of valve lift phase control mechanism 302 is deviated by more than the predetermined reference value from the desired operating position, then controller 22 proceeds to Step S48.

At Step S47, controller 22 outputs control signals to valve event and lift control mechanism 301, valve lift phase control mechanism 302, and nominal compression ratio control mechanism 3 in such a manner to hold their respective current operating positions, and then proceeds to Step S49.

At Step S48, controller 22 outputs a control signal to valve lift phase control mechanism 302 in such a manner to conform to the desired operating position, and then proceeds to Step S49.

At Step S49, controller 22 measures again the current actual operating position of valve lift phase control mechanism 302, and then proceeds to Step S50.

At Step S50, controller 22 judges whether or not the current actual operating position of valve lift phase control mechanism 302 is within the predetermined reference value from the desired operating position. When judging that the current actual operating position of valve lift phase control mechanism 302 is not within the predetermined reference value from the desired operating position, then controller 22 proceeds back to Step S49. On the other hand, when judging that the current actual operating position of valve lift phase control mechanism 302 is within the predetermined reference value from the desired operating position, then controller 22 proceeds to Step S51.

At Step S51, controller 22 energizes starter motor 107 so as to start a cranking operation, and then proceeds to Step S52. Just after the start of cranking operation at Step S51, at Step S52, controller 22 outputs control signals to a fuel injector and ignition plug 105 to implement steady-state engine operation, and then returns from the present control process.

The foregoing control process serves for smooth engine starting operation. Because controller 22 is configured to output a control signal to valve lift phase control mechanism 302 before engine cranking, exhaust valve opening timing EVO is suitably controlled according to nominal expansion ratio $\epsilon_{E0}$ at or before the initial stage of engine cranking. This is effective for allowing the crankshaft to smoothly start to rotate at the initial stage of engine cranking, suppressing vibrations and preignition during engine start, and thereby achieving smooth engine start with stable combustion. This serves for enhancing the exhaust emission performance of the engine.

Figure 18:
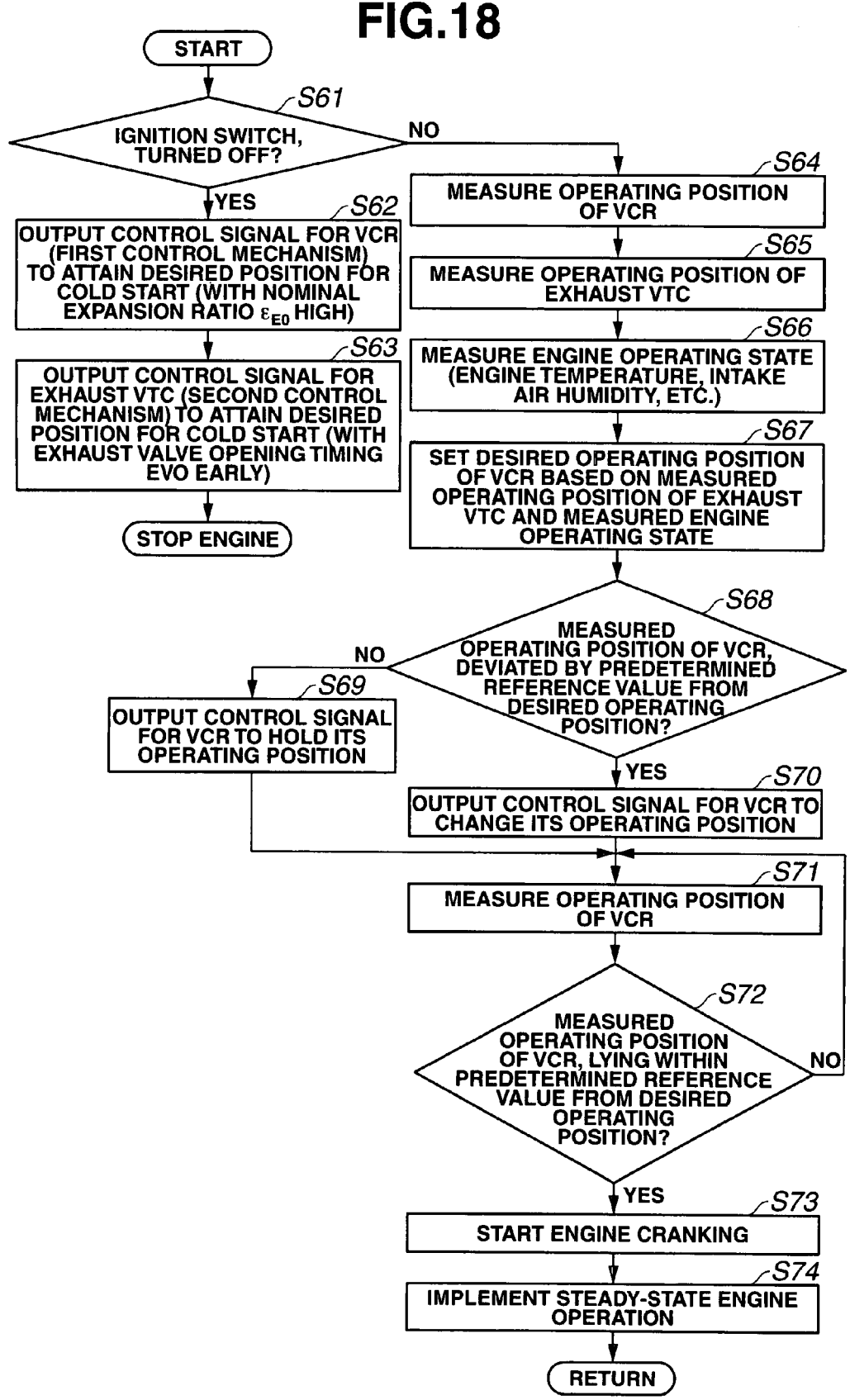
FIG. 18 is a flow chart showing a control process to be performed by a controller according to the fourth embodiment.
Figure 19:
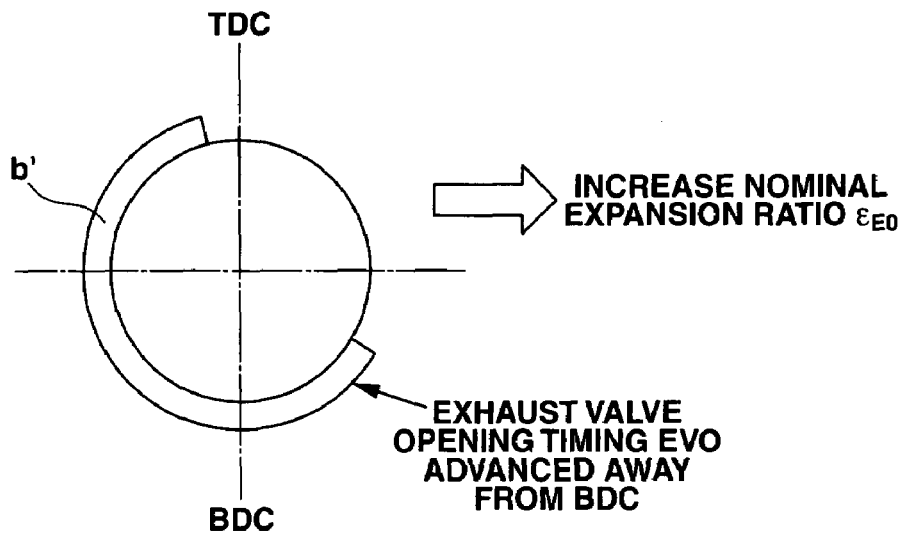
FIG. 19 illustrates an example of how the exhaust valve opening timing is corrected in accordance with the fourth embodiment.
Figure 20:
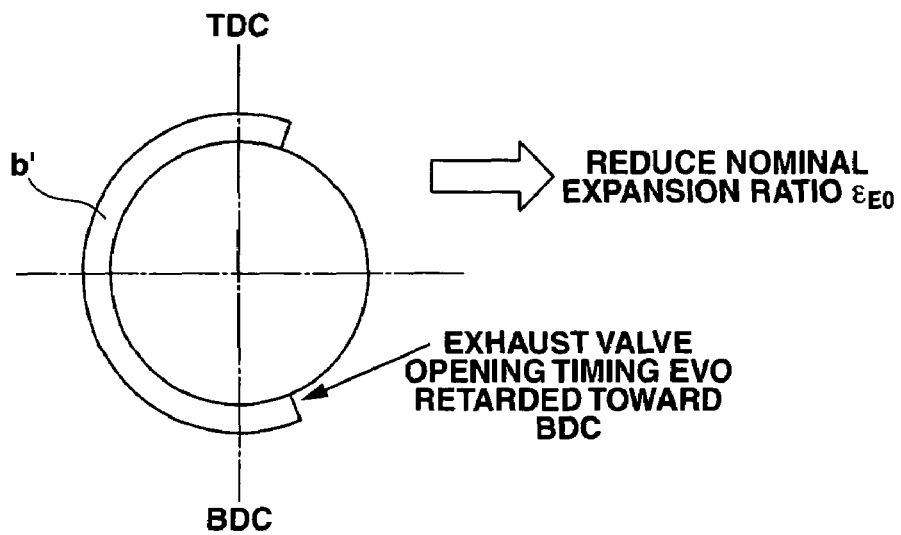
FIG. 20 illustrates another example of how the exhaust valve opening timing is corrected in accordance with the fourth embodiment.
Figure 21:
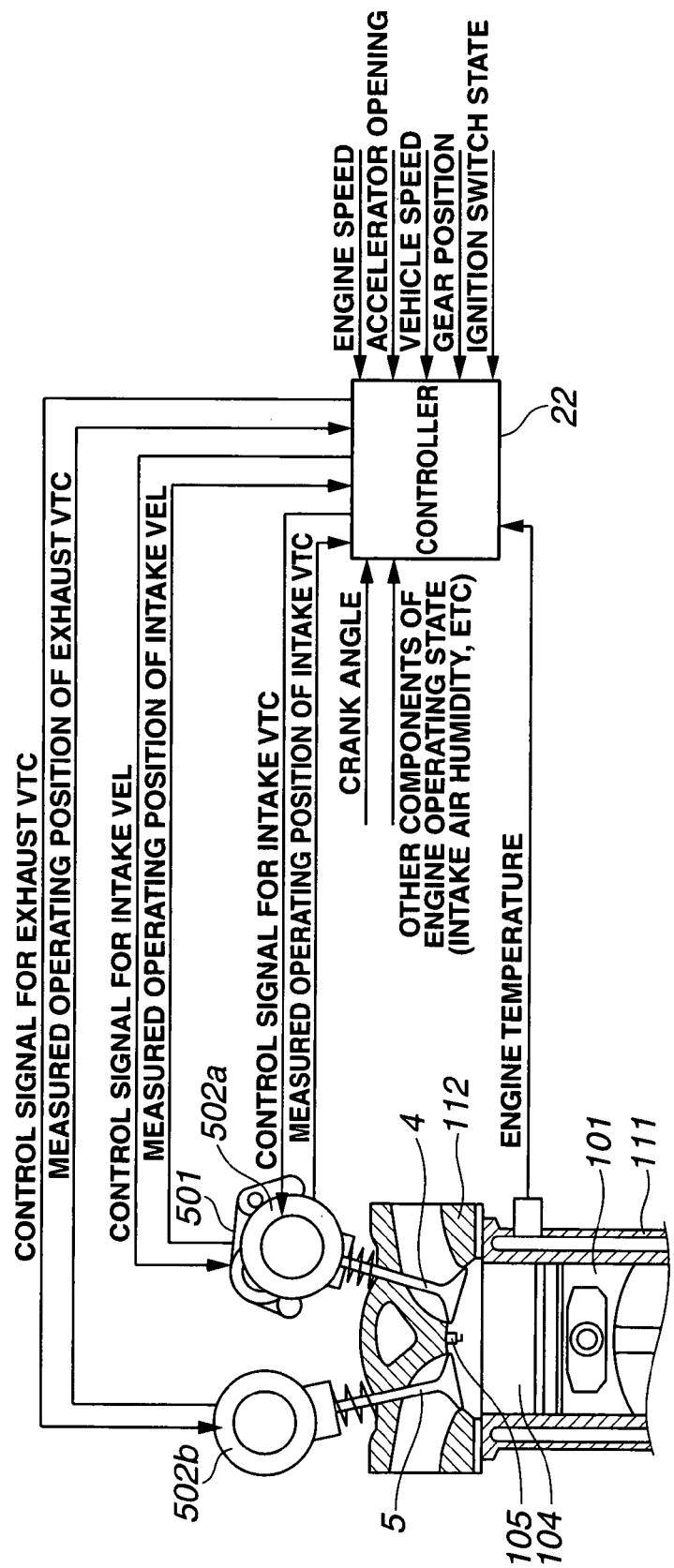
FIG. 21 is a schematic diagram showing an internal combustion engine with a start control apparatus according to a fifth embodiment of the present invention.

The following describes a start control apparatus for an internal combustion engine according to a fourth embodiment of the present invention with reference to FIGS. 18 to 20. The fourth embodiment is constructed based on the third embodiment, and differs from the third embodiment in that no valve event and lift control mechanism 301 is provided. In this embodiment, the first control mechanism is assumed to include nominal compression ratio control mechanism 3, while the second control mechanism is assumed to include valve lift phase control mechanism 302. The following describes with reference to FIG. 18 how controller 22 is configured to control valve lift phase control mechanism 302, and nominal compression ratio control mechanism 3 for controlling the effective expansion ratio $\epsilon_E$. Entering the control process shown in FIG. 18, controller 22 first proceeds to Step S61.

At Step S61, controller 22 judges whether or not the ignition switch is turned off. When judging that the ignition switch is turned off, then controller 22 proceeds to Step S62. On the other hand, when judging that the ignition switch is not turned off, then controller 22 proceeds to Step S64. Steps S62 and S63 are provided in order to prepare for engine restart when the engine is in cold condition.

At Step S62, controller 22 outputs a control signal for nominal compression ratio control mechanism 3 in such a manner to set nominal expansion ratio $\epsilon_{E0}$ to be relatively high, and then proceeds to Step S63.

At Step S63, controller 22 outputs a control signal for valve lift phase control mechanism 302 in such a manner to set exhaust valve opening timing EVO to be relatively early. As a result, when the engine stops, exhaust valve opening timing EVO is already changed or is being changed for preparing for engine restart.

At Steps S64 to S66, controller 22 measures a current value of nominal expansion ratio $\epsilon_{E0}$ that is controlled and defined by nominal compression ratio control mechanism 3, measures a current actual operating position of valve lift phase control mechanism 302 on the basis of data signals outputted from the associated sensors, and measures an engine operating state on the basis of the data signals outputted from the associated sensors wherein the engine operating state includes engine temperature T1 and intake air humidity H1, and then proceeds to Step S67.

At Step S67, controller 22 sets a desired operating position of nominal compression ratio control mechanism 3 on the basis of the measured operating position of valve lift phase control mechanism 302, and the engine operating state, and then proceeds to Step S68.

At Step S68, controller 22 judges whether or not the current actual operating position of nominal compression ratio control mechanism 3 is deviated by more than a predetermined reference value from the desired operating position. When judging that the current actual operating position of nominal compression ratio control mechanism 3 is not deviated by more than the predetermined reference value from the desired operating position, then controller 22 proceeds to Step S69. On the other hand, when judging that the current actual operating position of nominal compression ratio control mechanism 3 is deviated by more than the predetermined reference value from the desired operating position, then controller 22 proceeds to Step S70.

At Step S69, controller 22 outputs control signals to valve lift phase control mechanism 302, and nominal compression ratio control mechanism 3 in such a manner to hold their respective current operating positions, and then proceeds to Step S71.

At Step S70, controller 22 outputs a control signal to nominal compression ratio control mechanism 3 in such a manner to conform to the desired operating position, and then proceeds to Step S71. Specifically, controller 22 operates as follows. For example, when effective expansion ratio $\epsilon_E$ is relatively low with exhaust valve opening timing EVO being relatively early as indicated by "b'" in FIG. 19, then controller 22 sets a control signal for nominal compression ratio control mechanism 3 in such a manner to increase nominal expansion ratio $\epsilon_{E0}$. On the other hand, when effective expansion ratio $\epsilon_E$ is relatively high with exhaust valve opening timing EVO being relatively late as indicated by "b'" in FIG. 20, then controller 22 sets the control signal for nominal compression ratio control mechanism 3 in such a manner to reduce nominal expansion ratio $\epsilon_{E0}$.

When nominal expansion ratio $\epsilon_{E0}$ is increased, nominal compression ratio $\epsilon_{C0}$ is increased accordingly so as to improve the combustion process in the cylinder. This is also effective for increasing the effective work of piston 101 so as to stabilize the combustion process in the cylinder. Although this tends to reduce the exhaust gas temperature, the exhaust gas temperature is actually maintained because exhaust valve opening timing EVO is set to be relatively early by valve lift phase control mechanism 302 so that the temperature of the incylinder gas is relatively high when exhaust valves 5, 5 open. This suppresses hydrocarbons contained in the exhaust gas. On the other hand, when nominal expansion ratio $\epsilon_{E0}$ is reduced, effective expansion ratio $\epsilon_E$ is reduced so as to increase the exhaust gas temperature. Thus, according to the foregoing control process in which nominal expansion ratio $\epsilon_{E0}$ is controlled according to the operating position of valve lift phase control mechanism 302, it is possible to enhance the exhaust emission performance.

Moreover, controller 22 slightly corrects the desired operating position of nominal compression ratio control mechanism 3. For example, when the engine temperature is relatively high in the case of FIG. 20, nominal expansion ratio $\epsilon_{E0}$ is increased in order to increase the effective work, stabilize the combustion process, and improve the fuel efficiency, while the exhaust gas temperature is maintained to be sufficiently high because the engine temperature is high.

At Step S71, controller 22 measures again the current actual operating position of nominal compression ratio control mechanism 3, and then proceeds to Step S71.

At Step S72, controller 22 judges whether or not the current actual operating position of nominal compression ratio control mechanism 3 is within a predetermined reference value from the desired operating position. When judging that the current actual operating position of nominal compression ratio control mechanism 3 is not within the predetermined reference value from the desired operating position, then controller 22 proceeds back to Step S71. On the other hand, when judging that the current actual operating position of nominal compression ratio control mechanism 3 is within the predetermined reference value from the desired operating position, then controller 22 proceeds to Step S73.

At Step S73, controller 22 energizes starter motor 107 so as to start a cranking operation, and then proceeds to Step S74. Just after the start of cranking operation at Step S73, at Step S74, controller 22 outputs control signals to a fuel injector and ignition plug 105 to implement steady-state engine operation, and then returns from the present control process.

The following describes a start control apparatus for an internal combustion engine according to a fifth embodiment of the present invention with reference to FIGS. 21 to 24. The fifth embodiment is constructed based on the first embodiment, and differs from the first embodiment in that a valve event and lift control mechanism 501, and a valve lift phase control mechanism 502a are provided at intake valves 4, 4, a valve lift phase control mechanism 502b is provided at exhaust valves 5, 5, and no nominal compression ratio control mechanism 3 is provided. In this embodiment, the first control mechanism is assumed to include valve event and lift control mechanism 501 and valve lift phase control mechanism 502a, while the second control mechanism is assumed to include valve lift phase control mechanism 502b.

When exhaust valve opening timing EVO is relatively early away from bottom dead center, effective expansion ratio $\epsilon_E$ is relatively low so that the exhaust gas temperature is relatively high, and the level of exhaust emissions is relatively low. However, the effective work is relatively small so that the rotation of the engine is relatively unstable. The control of retarding the intake valve closing timing IVC is effective for increasing the effective compression ratio $\epsilon_C$ and thereby improving the combustion process.

On the other hand, when exhaust valve opening timing EVO is relatively late near bottom dead center, effective expansion ratio $\epsilon_E$ is relatively high so that the exhaust gas temperature is relatively low. The control of advancing the intake valve closing timing IVC is effective for reducing the effective compression ratio $\epsilon_C$ so as to reduce the combustion rate, so as to increase the exhaust gas temperature at exhaust valve opening timing EVO, and to reduce hydrocarbons contained in the exhaust emissions.

Figure 22:
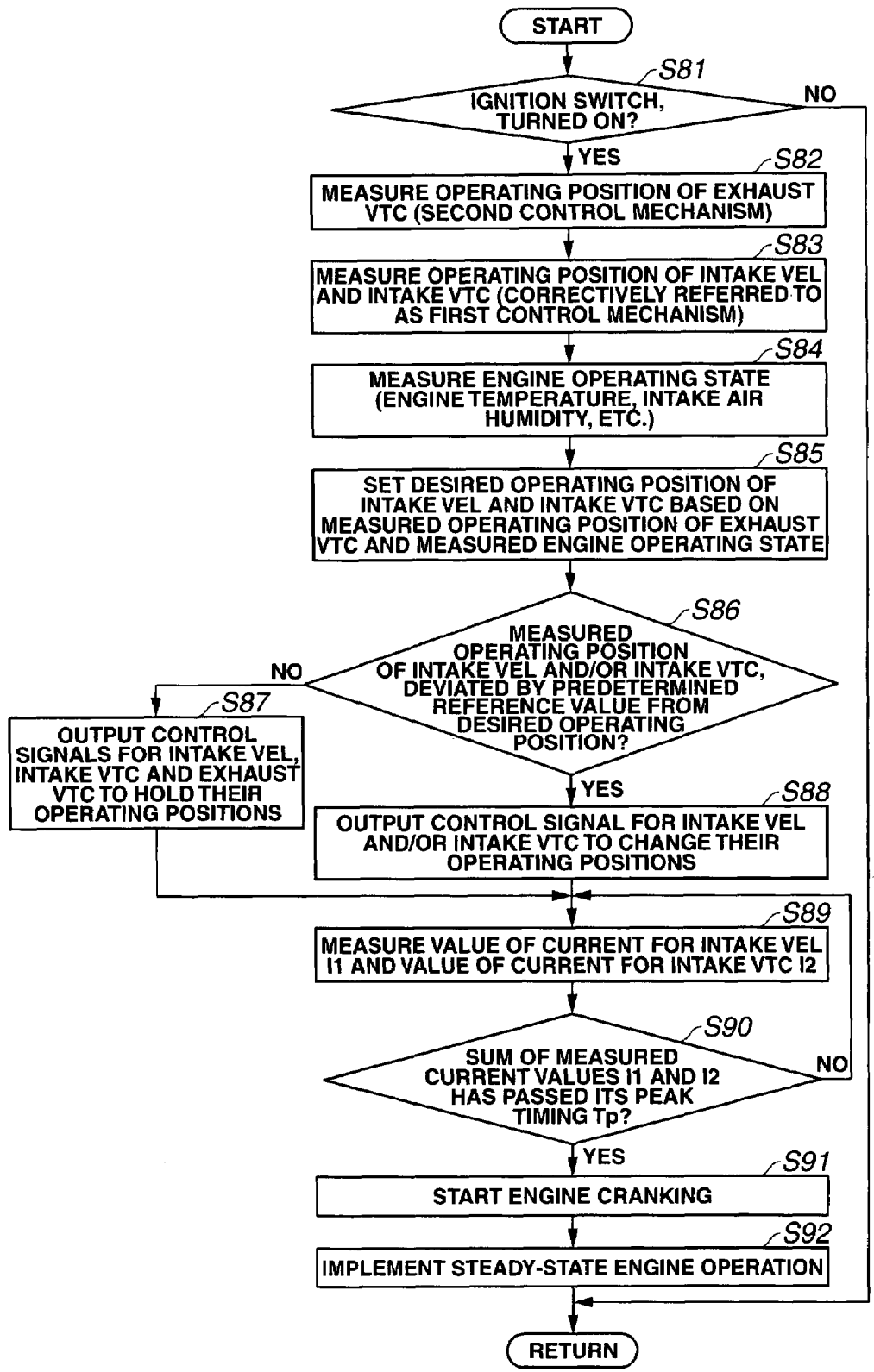
FIG. 22 is a flow chart showing a control process to be performed by a controller according to the fifth embodiment.

The following describes with reference to FIG. 22 how controller 22 is configured to control valve event and lift control mechanism 501, valve lift phase control mechanism 502a, and valve lift phase control mechanism 502b. Entering the control process shown in FIG. 22, controller 22 first proceeds to Step S81.

At Step S81, controller 22 judges whether or not the ignition switch is turned on. When judging that the ignition switch is not turned on, then controller 22 returns from the present control process. On the other hand, when judging that the ignition switch is turned on, then controller 22 proceeds to Steps S82 to S84. At Steps S82 to S84, controller 22 measures a current actual operating position of valve event and lift control mechanism 501, a current actual operating position of valve lift phase control mechanism 502a, and a current actual operating position of valve lift phase control mechanism 502b, on the basis of data signals outputted from the associated sensors, and measures an engine operating state on the basis of the data signals outputted from the associated sensors wherein the engine operating state includes engine temperature T1 and intake air humidity H1, and then proceeds to Step S85.

At Step S85, controller 22 sets a desired operating position of valve event and lift control mechanism 501 and a desired operating position of valve lift phase control mechanism 502a on the basis of the measured operating position of valve lift phase control mechanism 502b, and the engine operating state, and then proceeds to Step S86. Specifically, controller 22 operates at Step S85 as follows. For example, when exhaust valve opening timing EVO is relatively early away from bottom dead center as indicated by "b" in FIG. 24, then controller 22 sets control signals for valve event and lift control mechanism 501 and valve lift phase control mechanism 502a in such a manner to vary intake valve closing timing IVC from a relatively early timing as indicated by "a'" in FIG. 24 to a relatively late timing as indicated by "a" in FIG. 24. This is effective for increasing the effective compression ratio $\epsilon_C$ and thereby improving the combustion process. This combination of exhaust valve opening timing EVO and intake valve closing timing IVC is effective for stabilizing the engine rotation and enhancing the exhaust emission performance.

Moreover, intake valve opening timing IVO may be slightly retarded by suitably controlling the valve event and lift control mechanism 501 and valve lift phase control mechanism 502a. This is effective for increasing the negative pressure when intake valves 4, 4 open, enhancing the incylinder gas motion of the air-fuel mixture, and thereby further improving the fuel efficiency.

Figure 23:
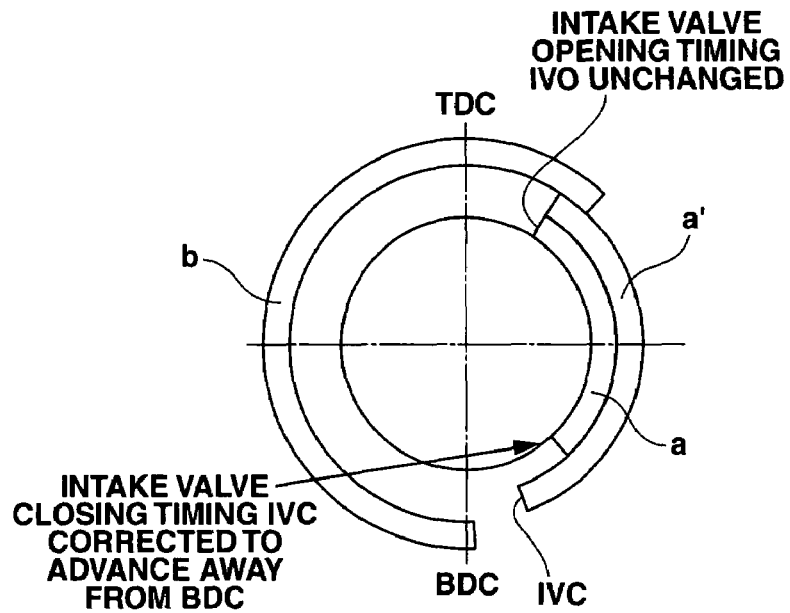
FIG. 23 illustrates an example of how the intake valve opening timing and the intake valve closing timing are corrected in accordance with the fifth embodiment.

On the other hand, when exhaust valve opening timing EVO is relatively late near bottom dead center as indicated by "b" in FIG. 23, then controller 22 sets control signals for valve event and lift control mechanism 501 and valve lift phase control mechanism 502a in such a manner to vary intake valve closing timing IVC from a relatively late timing as indicated by "a'" in FIG. 23 to a relatively early timing as indicated by "a" in FIG. 23. This is effective for reducing the effective compression ratio $\epsilon_C$ so as to reduce the combustion rate, to raise the exhaust gas temperature at exhaust valve opening timing EVO, and thereby to reduce hydrocarbons contained in the exhaust gas.

Moreover, intake valve opening timing IVO may be held substantially constant by suitably controlling the valve event and lift control mechanism 501 valve lift phase control mechanism 502a. This increases the valve overlap between exhaust valve opening timing EVO and intake valve opening timing IVO so as to reduce the combustion rate, and to increase the exhaust gas temperature at exhaust valve opening timing EVO, and thereby to improve further the exhaust emission performance.

At Steps S87 to S92, controller 22 operates similarly as at Steps S26 to S32 in the second embodiment.

The following describes a modification of the fifth embodiment. This modification differs from the fifth embodiment in that the first control mechanism is assumed to include valve lift phase control mechanism 502a without valve event and lift control mechanism 501.

According to the modification of the fifth embodiment, controller 22 measures only the actual operating position of valve lift phase control mechanism 502a at Step S83; sets only the desired operating position of valve lift phase control mechanism 502a at Step S85; when judging that the actual operating position of valve lift phase control mechanism 502a is deviated by a predetermined reference value from the desired operating position at Step S88, outputs a control signal to valve lift phase control mechanism 502a. Moreover, controller 22 measures a current value I2 of a current flowing through valve lift phase control mechanism 502a at Step S89; when judging that current value I2 has passed its peak timing at Step S91, implements a steady-state engine operation at Step S92.

Figure 24:
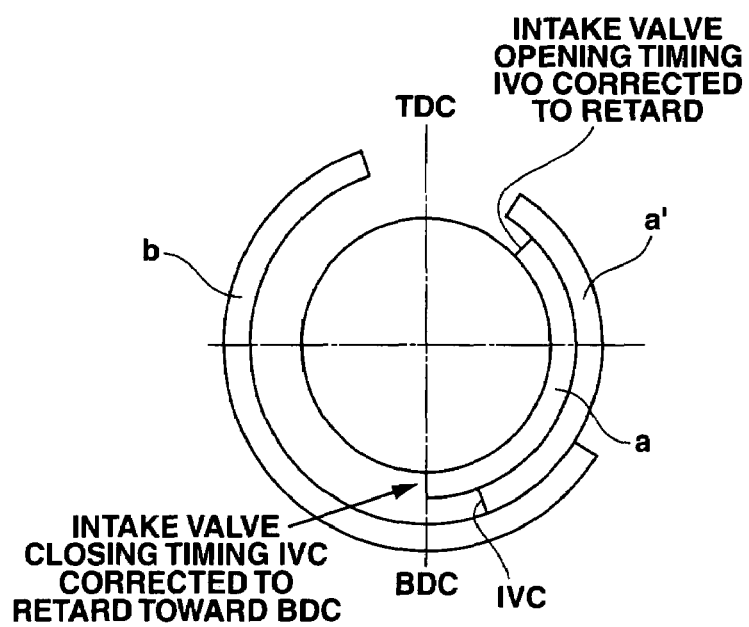
FIG. 24 illustrates another example of how the intake valve opening timing and the intake valve closing timing are corrected in accordance with the fifth embodiment.

The setting of the desired operating position of valve lift phase control mechanism 502a at Step S89 is implemented by: when exhaust valve opening timing EVO is relatively early away from bottom dead center as indicated by "b" in FIG. 24, retarding the intake valve closing timing IVC near bottom dead center. This is effective for improving the combustion process.

On the other hand, when exhaust valve opening timing EVO is relatively late near bottom dead center as indicated by "b" in FIG. 23, controller 22 advances intake valve closing timing IVC away from bottom dead center so as to reduce effective compression ratio $\epsilon_C$. This is effective for reducing the combustion rate, increasing the exhaust gas temperature at exhaust valve opening timing EVO, enhancing the exhaust gas temperature, and thereby improving the exhaust emission performance.

Figure 25:
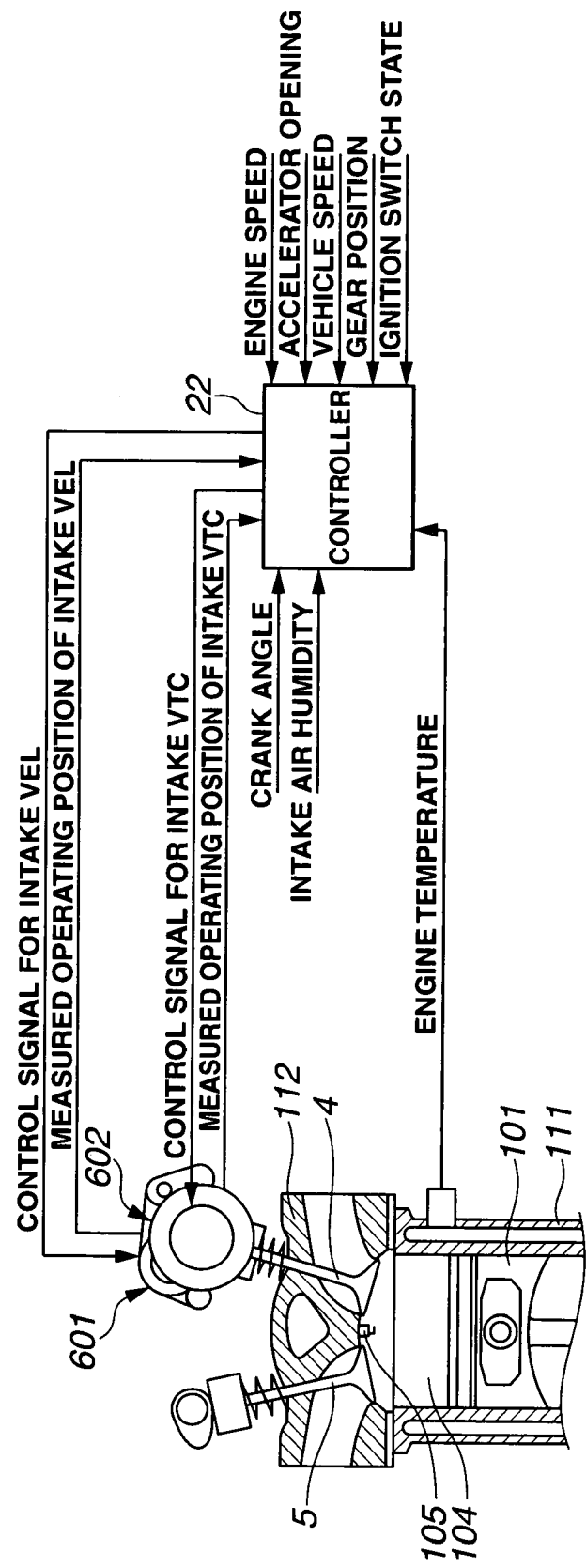
FIG. 25 is a schematic diagram showing an internal combustion engine with a start control apparatus according to a sixth embodiment of the present invention.
Figure 26:
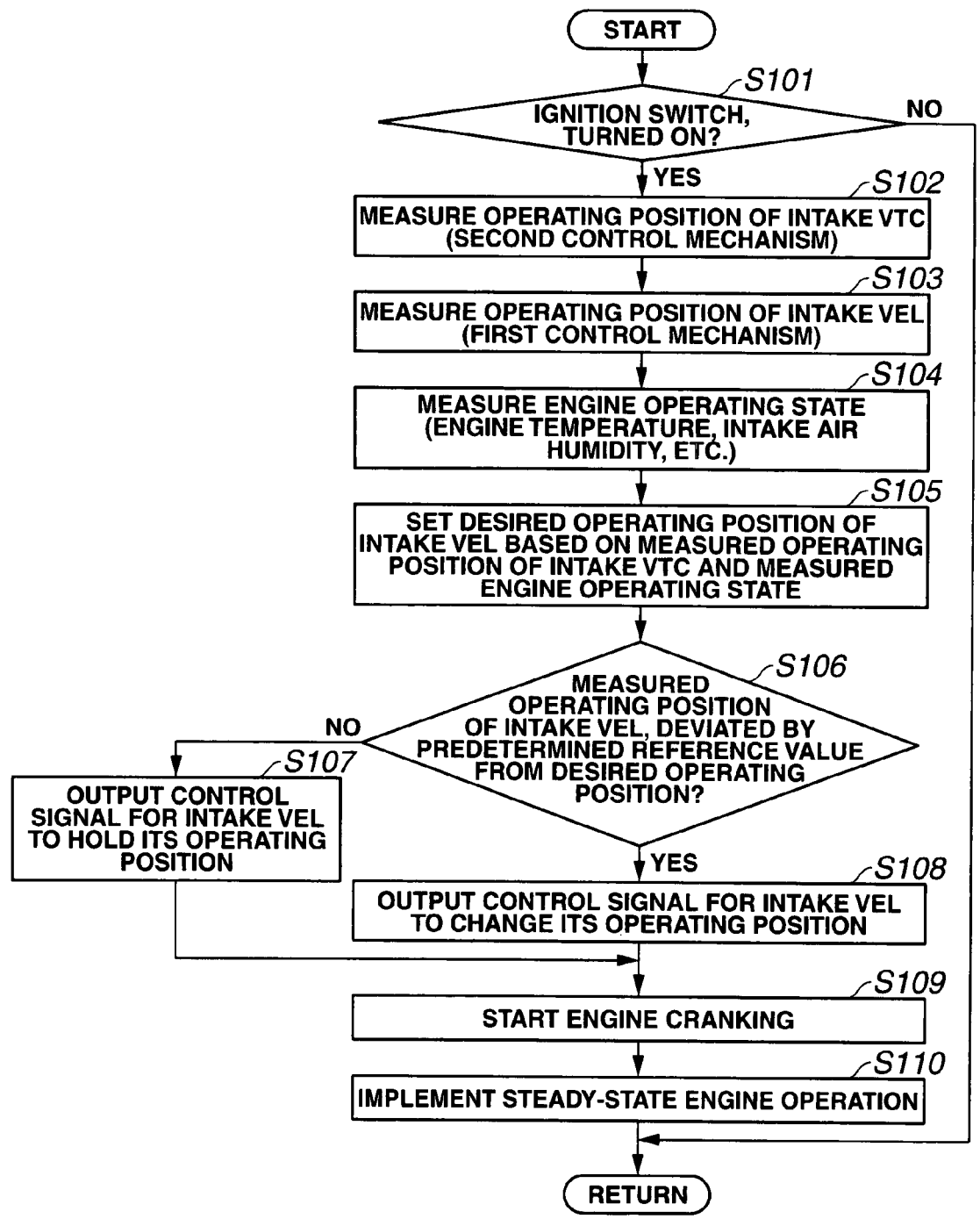
FIG. 26 is a flow chart showing a control process to be performed by a controller according to the sixth embodiment.
Figure 27:
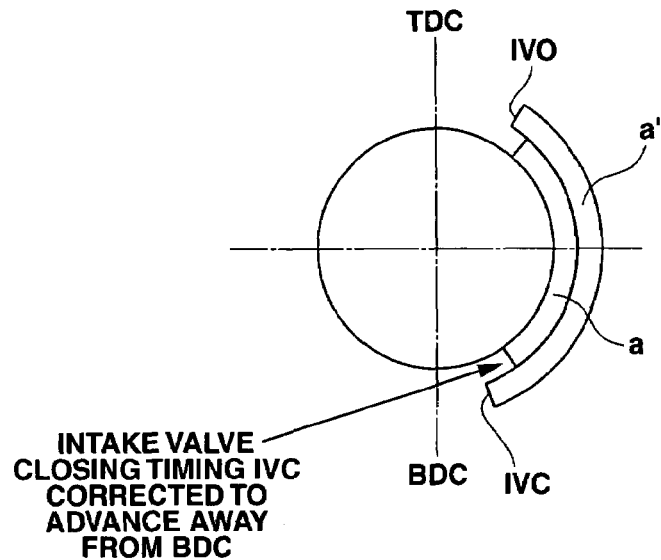
FIG. 27 illustrates an example of how the valve lift degree is corrected according to the sixth embodiment.

The following describes a start control apparatus for an internal combustion engine according to a sixth embodiment of the present invention with reference to FIGS. 25 to 27. The start control apparatus includes a valve event and lift control mechanism 601 and a valve lift phase control mechanism 602 for intake valves 4, 4, and no nominal compression ratio control mechanism. In this embodiment, the first control mechanism is assumed to include valve event and lift control mechanism 601, while the second control mechanism is assumed to include valve lift phase control mechanism 602. On the basis of the engine operating state including the operating position of valve lift phase control mechanism 602, controller 22 sets a desired operating position of valve event and lift control mechanism 601, and outputs a control signal to valve event and lift control mechanism 601 before engine cranking so as to attain the desired operating position. The following describes with reference to FIG. 26 how controller 22 is configured to control valve event and lift control mechanism 601, and valve lift phase control mechanism 602. Entering the control process shown in FIG. 26, controller 22 first proceeds to Step S101.

At Step S101, controller 22 judges whether or not the ignition switch is turned on. When judging that the ignition switch is not turned on, then controller 22 returns from the present control process. On the other hand, when judging that the ignition switch is turned on, then controller 22 proceeds to Step S102.

At Step S102, controller 22 measures a current actual operating position of valve lift phase control mechanism 602 on the basis of data signals outputted from the associated sensors, and then proceeds to Step S103.

At Step S103, controller 22 measures a current actual operating position of valve event and lift control mechanism 601 on the basis of data signals outputted from the associated sensors, and then proceeds to Step S104.

At Step S104, controller 22 measures an engine operating state on the basis of the data signals outputted from the associated sensors wherein the engine operating state includes engine temperature T1 and intake air humidity H1, and then proceeds to Step S105.

At Step S105, controller 22 sets a desired operating position of valve event and lift control mechanism 601 on the basis of the measured operating position of valve lift phase control mechanism 602, and the engine operating state, and then proceeds to Step S106. Specifically, controller 22 operates at Step S105 as follows. For example, when intake valve closing timing IVC is later near bottom dead center than desired, then controller 22 sets a control signal for valve event and lift control mechanism 601 in such a manner to allow valve event and lift control mechanism 601 to vary the lift degree of intake valves 4, 4 from a relatively large lift degree as indicated by "a'" in FIG. 27 to a relatively small lift degree indicated by "a" in FIG. 27 so that intake valve closing timing IVC advances away from bottom dead center. This is effective for reducing the level of valve friction, and suitably setting the level of compression. On the other hand, when intake valve closing timing IVC is earlier away from bottom dead center than desired, then controller 22 sets the control signal for valve event and lift control mechanism 601 in such a manner to allow valve event and lift control mechanism 601 to vary the lift degree of intake valves 4, 4 from a relatively small lift degree as indicated by "a" in FIG. 27 to a relatively large lift degree indicated by "a'" in FIG. 27 so that intake valve closing timing IVC retards toward bottom dead center.

At Step S106 to S110, controller 22 operates similarly as at Steps S5 to S11 in FIG. 7 in the first embodiment.

Figure 30:
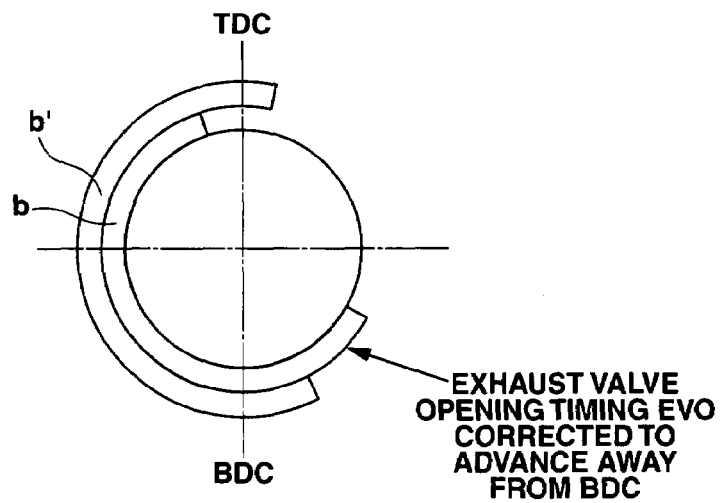
FIG. 30 illustrates an example of how the exhaust valve opening timing is corrected in accordance with to the seventh embodiment.
Figure 28:
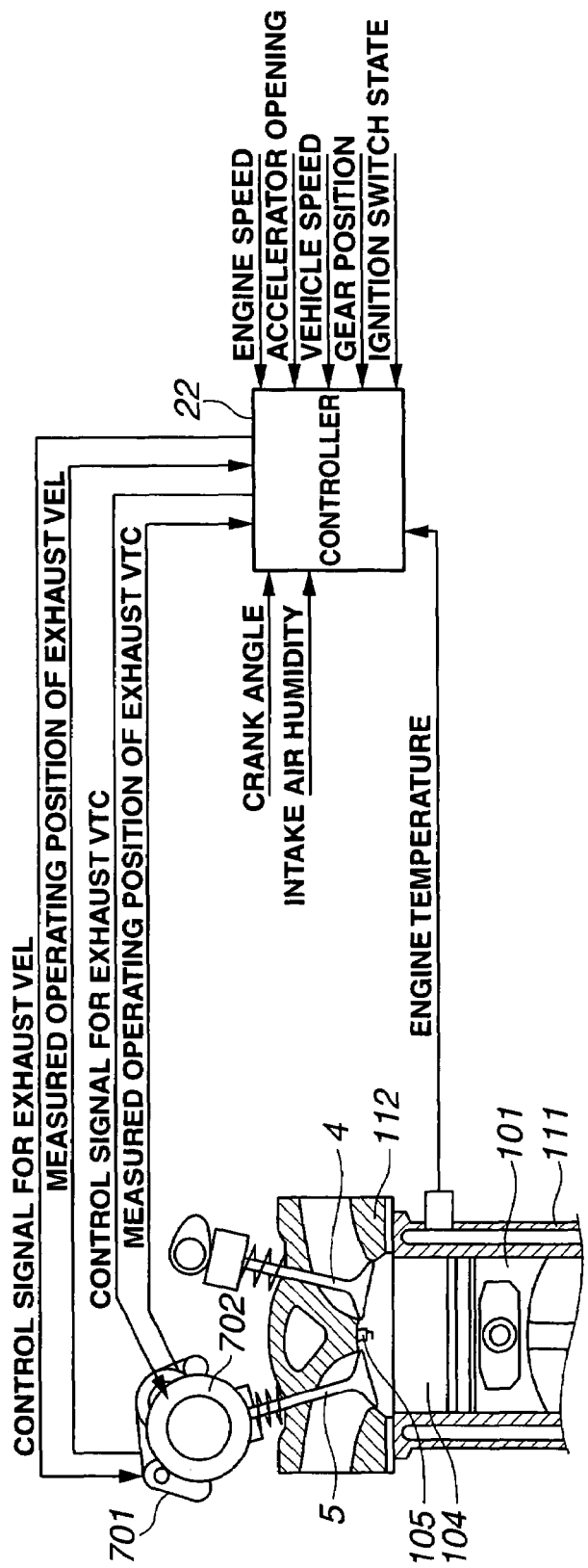
FIG. 28 is a schematic diagram showing an internal combustion engine with a start control apparatus according to a seventh embodiment of the present invention.
Figure 29:
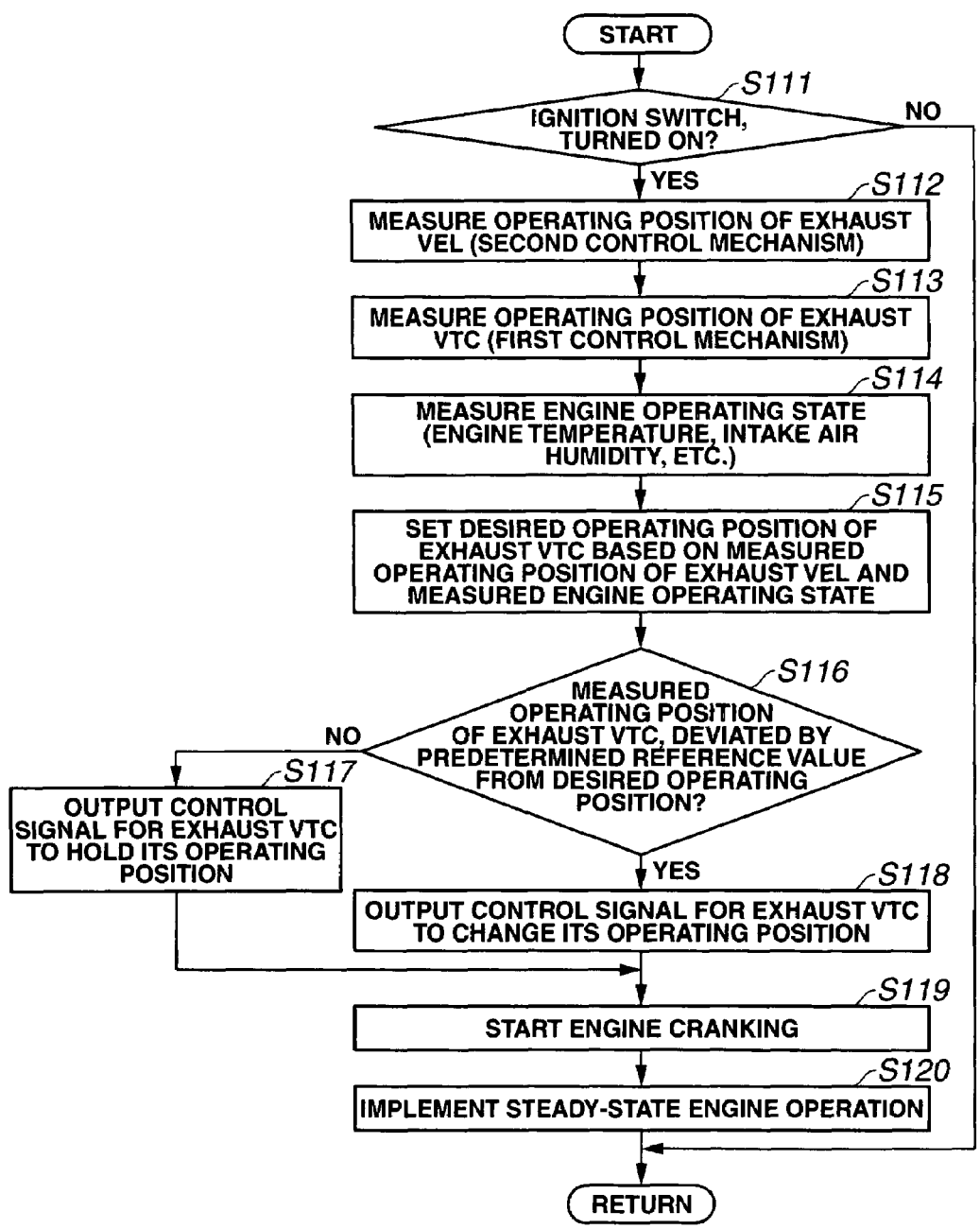
FIG. 29 is a flow chart showing a control process to be performed by a controller according to the seventh embodiment.

The following describes a start control apparatus for an internal combustion engine according to a seventh embodiment of the present invention with reference to FIGS. 28 to 30. The start control apparatus includes a valve event and lift control mechanism 701 and a valve lift phase control mechanism 702 for exhaust valves 5, 5, and no nominal compression ratio control mechanism. In this embodiment, the first control mechanism is assumed to include valve lift phase control mechanism 702, while the second control mechanism is assumed to include valve event and lift control mechanism 701. On the basis of the engine operating state including the operating position of valve event and lift control mechanism 701, controller 22 sets a desired operating position of valve lift phase control mechanism 702, and outputs a control signal to valve lift phase control mechanism 702 before engine cranking so as to attain the desired operating position. The following describes with reference to FIG. 29 how controller 22 is configured to control valve event and lift control mechanism 701, and valve lift phase control mechanism 702. Entering the control process shown in FIG. 29, controller 22 first proceeds to Step S111.

At Step S111, controller 22 judges whether or not the ignition switch is turned on. When judging that the ignition switch is not turned on, then controller 22 returns from the present control process. On the other hand, when judging that the ignition switch is turned on, then controller 22 proceeds to Step S112.

At Step S112, controller 22 measures a current actual operating position of valve event and lift control mechanism 701 on the basis of data signals outputted from the associated sensors, and then proceeds to Step S113.

At Step S113, controller 22 measures a current actual operating position of valve lift phase control mechanism 702 on the basis of data signals outputted, from the associated sensors, and then proceeds to Step S114.

At Step S114, controller 22 measures an engine operating state on the basis of the data signals outputted from the associated sensors wherein the engine operating state includes engine temperature T1 and intake air humidity H1, and then proceeds to Step S115.

At Step S115, controller 22 sets a desired operating position of valve lift phase control mechanism 702 on the basis of the measured operating position of valve event and lift control mechanism 701, and the engine operating state, and then proceeds to Step S116. Specifically, controller 22 operates at Step S115 as follows. For example, when exhaust valve opening timing EVO is later near bottom dead center than desired, then controller 22 sets a control signal for valve lift phase control mechanism 702 in such a manner to allow valve lift phase control mechanism 702 to vary the central phase of the valve operating angle of exhaust valves 5, 5 from a relatively late phase as indicated by "b'" in FIG. 30 to a relatively early phase as indicated by "b" in FIG. 30 so that exhaust valve opening timing EVO advances away from bottom dead center. This is effective for reducing the effective expansion ratio $\epsilon_E$, increasing the exhaust gas temperature, enhancing the engine startability, and improving the exhaust emission performance. On the other hand, when exhaust valve opening timing EVO is earlier away from bottom dead center than desired, then controller 22 sets the control signal for valve lift phase control mechanism 702 in such a manner to allow valve lift phase control mechanism 702 to vary the central phase of the valve operating angle of exhaust valves 5, 5 from a relatively early phase as indicated by "b" in FIG. 30 to a relatively late phase as indicated by "b'" in FIG. 30 so that exhaust valve opening timing EVO retards toward bottom dead center.

At Step S116 to S120, controller 22 operates similarly as at Steps S5 to 511 in FIG. 7 in the first embodiment.

Although the valve event and lift control mechanism, the valve lift phase control mechanism, and the nominal compression ratio control mechanism according to the foregoing embodiments is powered by electric motors, they may be powered by other systems such as hydraulic systems. Also in such a case, controller 22 can energize a hydraulic pump before engine cranking, and control effective compression ratio $\epsilon_C$ or effective expansion ratio $\epsilon_E$ by operating the control mechanisms.

This application is based on a prior Japanese Patent Application No. 2006-287106 filed on Oct. 23, 2006. The entire contents of this Japanese Patent Application No. 2006-287106 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A start control apparatus for an internal combustion engine, comprising:
   a first control mechanism arranged to vary at least one of a compression ratio and an expansion ratio of a cylinder of the internal combustion engine, the first control mechanism including a first actuator arranged to receive a first control signal, and to control at least one of the compression ratio and the expansion ratio in accordance with the first control signal;
   a second control mechanism arranged to vary at least one of the compression ratio and the expansion ratio, the second control mechanism including a second actuator arranged to receive a second control signal, and to control at least one of the compression ratio and the expansion ratio in accordance with the second control signal; and
   a controller connected to the first and second control mechanisms for outputting the first and second control signals, the controller being configured to:
      measure a state of the internal combustion engine before cranking the internal combustion engine, the state including a state of the second control mechanism;
      set the first control signal in accordance with the measured state of the internal combustion engine; and
      output the set first control signal to the first control mechanism before cranking the internal combustion engine.

2. The start control apparatus as claimed in claim 1, wherein:
   the first control mechanism is arranged to vary at least one of the compression ratio and the expansion ratio by varying an effective stroke of a piston associated to the cylinder; and
   the second control mechanism is arranged to vary at least one of the compression ratio and the expansion ratio by varying a combustion chamber volume of the cylinder.

3. The start control apparatus as claimed in claim 1, wherein:
   the first control mechanism is arranged to vary the compression ratio by varying an intake valve closing timing, wherein the intake valve closing timing is defined as a timing when an intake valve associated to the cylinder closes; and
   the second control mechanism is arranged to vary a nominal compression ratio of the cylinder, wherein the nominal compression ratio is geometrically defined as a ratio of a volumetric capacity of the cylinder at intake bottom dead center with respect to the volumetric capacity at compression top dead center.

4. The start control apparatus as claimed in claim 3, wherein the state of the internal combustion engine further includes a temperature of the internal combustion engine.

5. The start control apparatus as claimed in claim 4, wherein when judging the temperature of the internal combustion engine as being low before cranking the internal combustion engine, the controller sets the first control signal in such a manner to allow the first control mechanism to set the intake valve closing timing to approach bottom dead center with decrease in the nominal compression ratio.

6. The start control apparatus as claimed in claim 4, wherein when judging the temperature of the internal combustion engine as being high before cranking the internal combustion engine, the controller sets the first control signal in such a manner to allow the first control mechanism to set the intake valve closing timing to deviate from bottom dead center with increase in the nominal compression ratio.

7. The start control apparatus as claimed in claim 1, wherein:
   the first control mechanism is arranged to vary the expansion ratio by varying an exhaust valve opening timing, wherein the exhaust valve opening timing is defined as a timing when an exhaust valve associated to the cylinder opens; and
   the second control mechanism is arranged to vary a nominal expansion ratio of the cylinder, wherein the nominal expansion ratio is geometrically defined as a ratio of a volumetric capacity of the cylinder at expansion bottom dead center with respect to the volumetric capacity at compression top dead center.

8. The start control apparatus as claimed in claim 7, wherein the state of the internal combustion engine further includes a temperature of the internal combustion engine.

9. The start control apparatus as claimed in claim 8, wherein when judging the temperature of the internal combustion engine as being low before cranking the internal combustion engine, the controller sets the first control signal in such a manner to allow the first control mechanism to set the exhaust valve opening timing to advance from bottom dead center with increase in the nominal expansion ratio.

10. The start control apparatus as claimed in claim 8, wherein when judging the nominal expansion ratio as being low before cranking the internal combustion engine, the controller sets the first control signal in such a manner to allow the first control mechanism to set the exhaust valve opening timing to retard toward bottom dead center.

11. The start control apparatus as claimed in claim 1, wherein:
   the first control mechanism is arranged to vary a nominal compression ratio of the cylinder, wherein the nominal compression ratio is geometrically defined as a ratio of a volumetric capacity of the cylinder at intake bottom dead center with respect to the volumetric capacity at compression top dead center; and
   the second control mechanism is arranged to vary the compression ratio by varying an intake valve closing timing, wherein the intake valve closing timing is defined as a timing when an intake valve associated to the cylinder closes.

12. The start control apparatus as claimed in claim 1, wherein:
   the first control mechanism is arranged to vary a nominal expansion ratio of the cylinder, wherein the nominal expansion ratio is geometrically defined as a ratio of a volumetric capacity of the cylinder at expansion bottom dead center with respect to the volumetric capacity at compression top dead center; and
   the second control mechanism is arranged to vary the expansion ratio by varying an exhaust valve opening timing, wherein the exhaust valve opening timing is defined as a timing when an exhaust valve associated to the cylinder opens.

13. The start control apparatus as claimed in claim 1, wherein:
   the first control mechanism is arranged to vary the compression ratio by varying an intake valve closing timing, wherein the intake valve closing timing is defined as a timing when an intake valve associated to the cylinder closes; and
   the second control mechanism is arranged to vary the expansion ratio by varying an exhaust valve opening timing, wherein the exhaust valve opening timing is defined as a timing when an exhaust valve associated to the cylinder opens.

14. The start control apparatus as claimed in claim 1, wherein:
   the first control mechanism is arranged to vary the expansion ratio by varying an exhaust valve opening timing, wherein the exhaust valve opening timing is defined as a timing when an exhaust valve associated to the cylinder opens; and
   the second control mechanism is arranged to vary the compression ratio by varying an intake valve closing timing, wherein the intake valve closing timing is defined as a timing when an intake valve associated to the cylinder closes.

15. The start control apparatus as claimed in claim 1, wherein:
   the first control mechanism is arranged to vary the compression ratio by varying an intake valve closing timing, wherein the intake valve closing timing is defined as a timing when an intake valve associated to the cylinder closes; and
   the second control mechanism is arranged to vary the compression ratio by varying the intake valve closing timing.

16. The start control apparatus as claimed in claim 1, wherein:
   the first control mechanism is arranged to vary the expansion ratio by varying an exhaust valve opening timing, wherein the exhaust valve opening timing is defined as a timing when an exhaust valve associated to the cylinder opens; and
   the second control mechanism is arranged to vary the expansion ratio by varying the exhaust valve opening timing.

17. The start control apparatus as claimed in claim 1, wherein the controller is further configured to:
   output the second control signal to the second control mechanism in such a manner to bring the second control mechanism into a state desired for starting the internal combustion engine, before stopping the internal combustion engine.

18. An internal combustion engine comprising:
   a cylinder;
   a first control mechanism arranged to vary at least one of a compression ratio and an expansion ratio of the cylinder, the first control mechanism including a first actuator arranged to receive a first control signal, and to control at least one of the compression ratio and the expansion ratio in accordance with the first control signal;
   a second control mechanism arranged to vary at least one of the compression ratio and the expansion ratio, the second control mechanism including a second actuator arranged to receive a second control signal, and to control at least one of the compression ratio and the expansion ratio in accordance with the second control signal; and
   a controller connected to the first and second control mechanisms for outputting the first and second control signals, the controller being configured to:
   measure a state of the internal combustion engine before cranking the internal combustion engine, the state including a state of the second control mechanism;
   set the first control signal in accordance with the measured state of the internal combustion engine; and
   output the set first control signal to the first control mechanism before cranking the internal combustion engine.

* * * * *